United States Patent
Buckley et al.

(10) Patent No.: US 11,733,773 B1
(45) Date of Patent: Aug. 22, 2023

(54) DYNAMIC UNIFORMITY CORRECTION FOR BOUNDARY REGIONS

(71) Applicant: Meta Platforms Technologies, LLC, Menlo Park, CA (US)

(72) Inventors: Edward Buckley, Redmond, WA (US); Thomas Scott Murdison, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 125 days.

(21) Appl. No.: 17/137,079

(22) Filed: Dec. 29, 2020

(51) Int. Cl.
*G06F 3/01* (2006.01)
*G09G 3/20* (2006.01)
*G09G 3/32* (2016.01)

(52) U.S. Cl.
CPC .......... *G06F 3/013* (2013.01); *G09G 3/2003* (2013.01); *G09G 3/2044* (2013.01); *G09G 3/32* (2013.01); *G09G 2320/0233* (2013.01); *G09G 2320/0242* (2013.01); *G09G 2320/0261* (2013.01); *G09G 2320/0666* (2013.01); *G09G 2320/08* (2013.01)

(58) Field of Classification Search
CPC ........ G06F 3/013; G09G 3/2003; G09G 3/32; G09G 2320/0233; G09G 2320/0242; G09G 2320/0666; G09G 2320/08
See application file for complete search history.

(56) References Cited

U.S. PATENT DOCUMENTS

| | | |
|---|---|---|
| 9,117,384 B2 | 8/2015 | Phillips et al. |
| 9,214,013 B2 | 12/2015 | Venkataraman et al. |
| 9,799,095 B2 | 10/2017 | Miki et al. |
| 10,636,116 B1 | 4/2020 | Gotsch |
| 10,871,627 B1 | 12/2020 | Fang et al. |
| 10,958,702 B1 | 3/2021 | Yang et al. |

(Continued)

FOREIGN PATENT DOCUMENTS

| | | |
|---|---|---|
| EP | 3585003 A1 | 12/2019 |
| WO | 2019224740 A1 | 11/2019 |

OTHER PUBLICATIONS

International Search report and Written Opinion for International Application No. PCT/US2021/044045, dated Nov. 8, 2021, 14 pages.

(Continued)

*Primary Examiner* — Antonio A Caschera
(74) *Attorney, Agent, or Firm* — Baker Botts L.L.P.

(57) ABSTRACT

In one embodiment, a computing system may determine, for a current frame, that a current eye position of a viewer with respect to a display is inside and within a first threshold distance to an outer edge of the display. The system may identify, based on the current eye position, pre-determined internal eye positions inside the outer edge and pre-determined external eye positions outside the outer edge, obtain pre-determined arrays of scaling factors associated with the pre-determined internal eye positions, and obtain additional arrays of scaling factors associated with the pre-determined external eye positions. The system may generate a single array of scaling factors based on the pre-determined and additional arrays, adjust pixel values of the current frame based on the single array, and output the current frame with the adjusted pixel values to the display. The arrays and adjusted pixel values may be associated with a particular color channel.

20 Claims, 21 Drawing Sheets

FIG. 6

(56) References Cited

U.S. PATENT DOCUMENTS

| | | |
|---|---|---|
| 11,009,713 B1 | 5/2021 | Fang et al. |
| 11,170,521 B1 | 11/2021 | Ben et al. |
| 11,265,577 B1 | 3/2022 | Waggoner |
| 11,454,779 B1 | 9/2022 | Fang et al. |
| 2007/0024614 A1 | 2/2007 | Tam et al. |
| 2007/0126657 A1 | 6/2007 | Kimpe |
| 2008/0062288 A1 | 3/2008 | Nose et al. |
| 2009/0179824 A1 | 7/2009 | Tsujimoto et al. |
| 2012/0019529 A1 | 1/2012 | Kimpe |
| 2012/0235893 A1 | 9/2012 | Phillips et al. |
| 2016/0196794 A1 | 7/2016 | Kim et al. |
| 2016/0260258 A1 | 9/2016 | Lo et al. |
| 2017/0124928 A1 | 5/2017 | Edwin et al. |
| 2017/0161951 A1 | 6/2017 | Fix et al. |
| 2017/0353717 A1 | 12/2017 | Zhou et al. |
| 2018/0184075 A1 | 6/2018 | Park et al. |
| 2018/0314324 A1 | 11/2018 | Abed Aljawad et al. |
| 2019/0222830 A1 | 7/2019 | Edwin et al. |
| 2019/0227319 A1 | 7/2019 | Trail et al. |
| 2019/0250409 A1* | 8/2019 | Stafford ............. G02B 27/0093 |
| 2020/0051483 A1 | 2/2020 | Buckley |
| 2020/0058266 A1 | 2/2020 | Fu et al. |
| 2020/0126180 A1 | 4/2020 | Gotsch |
| 2020/0279534 A1* | 9/2020 | Ji ........................ G09G 3/3648 |
| 2020/0366899 A1 | 11/2020 | Fitzgerald et al. |
| 2020/0400830 A1 | 12/2020 | Talbert et al. |
| 2021/0027694 A1 | 1/2021 | Buckley |
| 2021/0033856 A1 | 2/2021 | Zhang et al. |
| 2021/0133440 A1 | 5/2021 | Silverstein et al. |
| 2021/0191319 A1 | 6/2021 | Christmas |
| 2021/0302756 A1 | 9/2021 | Makinen et al. |
| 2021/0397006 A1 | 12/2021 | Takagi et al. |
| 2022/0005155 A1 | 1/2022 | Murdison et al. |
| 2022/0155613 A1 | 5/2022 | Krener-Iversen et al. |

OTHER PUBLICATIONS

International Search Report and Written Opinion for International Application No. PCT/US2022/021925, dated Jul. 7, 2022, 17 pages.

Kimpe T., et al., "Human Vision-Based Algorithm to Hide Defective Pixels in LCDs," Proceedings of SPIE, IEEE, US, Feb. 2006, vol. 6057, 10 pages, XP007904155.

Kress B.C., et al., "Waveguide Combiners for Mixed Reality Headsets: A Nanophotonics Design Perspective," Nanophotonics, published online Oct. 7, 2020, (2021) vol. 10, No. 1, pp. 41-74.

International Search Report and Written Opinion for International Application No. PCT/US2022/054250 dated Apr. 13, 2023, 12 pages.

International Search Report and Written Opinion for International Application No. PCT/US2023/010941, dated Mar. 28, 2023, 14 pages.

* cited by examiner

DYNAMIC UNIFORMITY CORRECTION FOR BOUNDARY REGIONS

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for determining and applying an appropriate correction map to compensate for waveguide non-uniformity in a display, given a current eye tracking position at or near an edge of the eye-box. For a particular eye position, the system may generate correction maps based on measured non-uniform light transmission characteristics of the waveguide as viewed from that particular eye position. For a static image viewed from that particular eye position, the system may eliminate the negative visual effect caused by the waveguide non-uniformity by applying correction maps generated for that eye position. For a series of dynamic images viewed from different eye positions, the system may use an eye tracking system to measure the eye position of the viewer dynamically and to determine the appropriate correction maps based on the dynamically measured eye positions.

In particular embodiments, the system may generate correction maps for a number of pre-determined eye positions (e.g., corresponding to a 6×6 mesh grid) with respect to the waveguide (e.g., a pupil replication waveguide). Each correction map may be associated with a particular RGB color channel and each pre-determined eye position may be associated with three correction maps, one for each of the RGB color channels. Each correction map may include a 2D array of scaling factors to scale the 2D image pixel values of that particular color channel. If the current eye position (X, Y) does not fall on a pre-determined eye position but instead falls between the grid of pre-determined eye positions, the system may identify sixteen pre-determined eye positions (e.g., a 4×4 array) associated with an area containing the current eye position (X, Y). The system may then apply bicubic interpolation on the respective correction maps associated with the sixteen pre-determined eye positions to generate correction maps (for RGB color channels) for the current eye position. Using this approach, however, when the current eye position is at or near an edge of the eye-box, there may be no samples for the points outside the eye-box with which to perform an interpolation and compute an appropriate correction map. It has been shown that if those points outside the box are ignored, the quality of the resulting interpolation is degraded.

The methods described in this application for computing appropriate correction maps given a current eye tracking position at or near an edge of the eye-box include accessing data associated with points outside the eye-box. One option for obtaining data associated with points outside the eye-box may include pre-computing correction maps associated with points outside the eye-box. For example, a 6×6 mesh grid of correction maps corresponding to pre-determined eye positions within the eye-box may be extended to be a 10×10 grid that includes samples outside the original 6×6 mesh grid, where the additional samples represent points outside the eye-box. This pre-computed data may be used in interpolations to compute an appropriate correction map when the current eye position is near an edge of the eye-box. Another option for obtaining data associated with points outside the eye-box may include extrapolating, at run-time, the data from pre-computed correction maps associated with points inside the eye-box to generate correction maps associated with points outside the eye-box. These extrapolations may use average, weighted average, or median values of existing samples inside and near an edge of the eye-box to generate values for the samples outside the eye-box using bilinear extrapolation, for example.

In particular embodiments, the system may correct the images to be displayed using correction maps that are generated based on the current eye position and one or more previous correction maps used for correcting preceding frames. The system may store the generated correction maps in a database and a computer storage. These correction maps may have a relatively low spatial resolution (e.g., 25 pixels× 25 pixels) to minimize the burden on system resource usage (e.g., storage space, memory access, processing power, CPU resources, etc.). The system may use bilinear interpolation or a similar interpolation to up-sample the correction maps to have a higher resolution that matches the image resolution or display resolution (e.g., 1856 pixels×1472 pixels). The system may then apply the high-resolution correction maps generated by the up-sampling process to the current frame with each high-resolution correction map being applied to one color channel before outputting the current frame for display. Applying these high-resolution correction maps may cause the pixel values of RGB color channels of the current frame to be adjusted by the corresponding scaling factors of respective high-resolution correction maps. As a result, the displayed content may appear smoother over time and more resilient to errors of the eye-tracking data. The visual effects caused by the waveguide non-uniformity may be eliminated or reduced, subject to the correction limit imposed by the maximum micro-LED brightness of the waveguide display.

In particular embodiments, a method for determining and applying an appropriate correction map to compensate for waveguide non-uniformity in a display may include a computing system determining, for a current frame, that a current eye position of a viewer with respect to a display is inside and within a first threshold distance to an outer edge of the display. The computing system may identify, based on the current eye position, pre-determined internal eye positions inside the outer edge of the display and pre-determined external eye positions outside the outer edge of the display, obtain pre-determined arrays of scaling factors associated with the pre-determined internal eye positions, and obtain additional arrays of scaling factors associated with the pre-determined external eye positions. The computing system may generate a single array of scaling factors based on the pre-determined arrays of scaling factors associated with the pre-determined internal eye positions and the additional arrays of scaling factors associated with the pre-determined external eye positions, adjust pixel values of the current frame based on the generated single array of scaling factors, and output the current frame with the adjusted pixel values to the display. Generating the single array of scaling factors may be further based on supplementary arrays of scaling factors used for correcting view-dependent non-uniformities of the display for one or more proceeding frames of the current frame. The arrays of scaling factors and the adjusted pixel values may be associated with a particular color channel.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
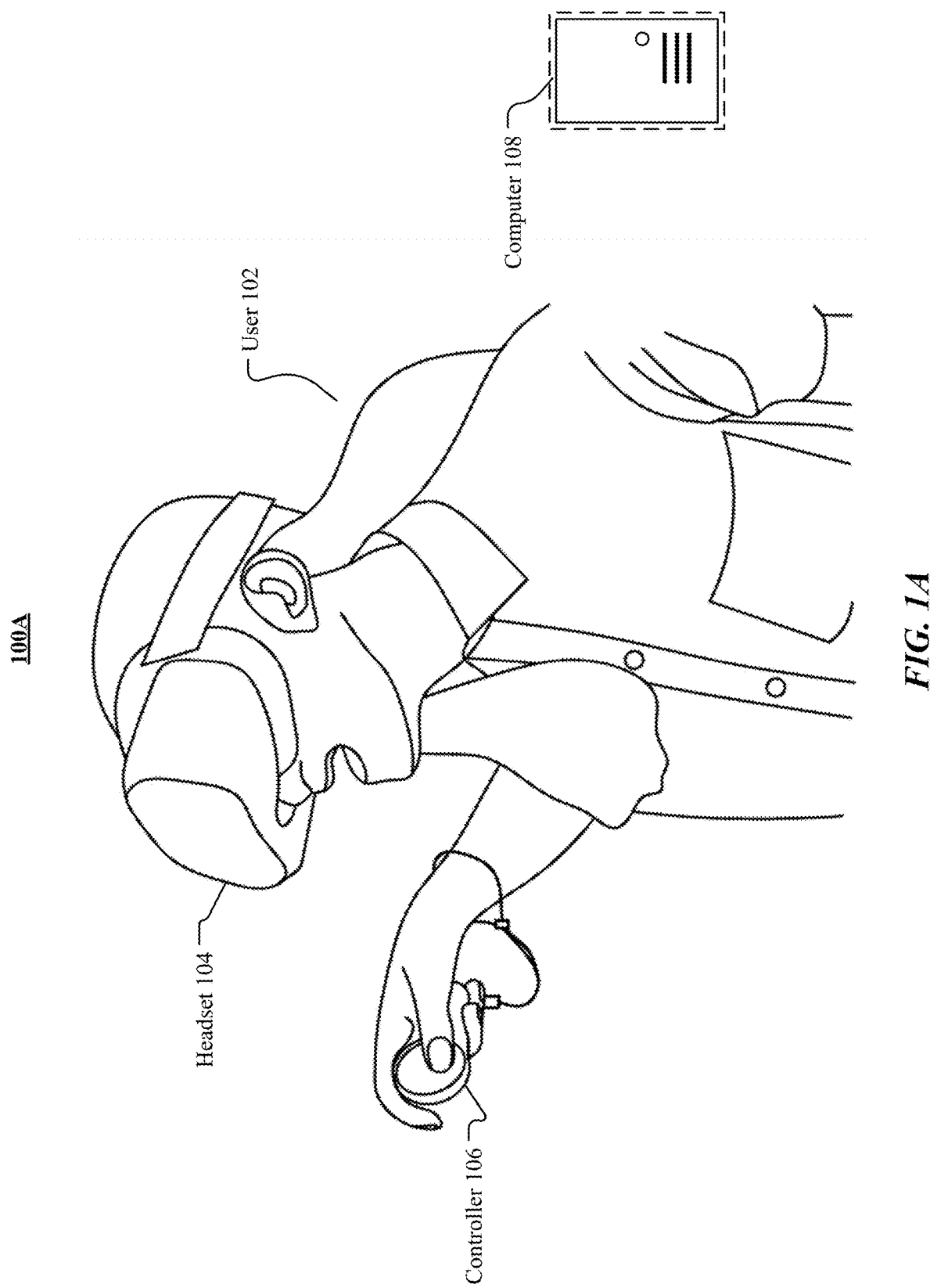
FIG. 1A illustrates an example artificial reality system.

FIG. 1A illustrates an example artificial reality system 100A. In particular embodiments, the artificial reality system 100A may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
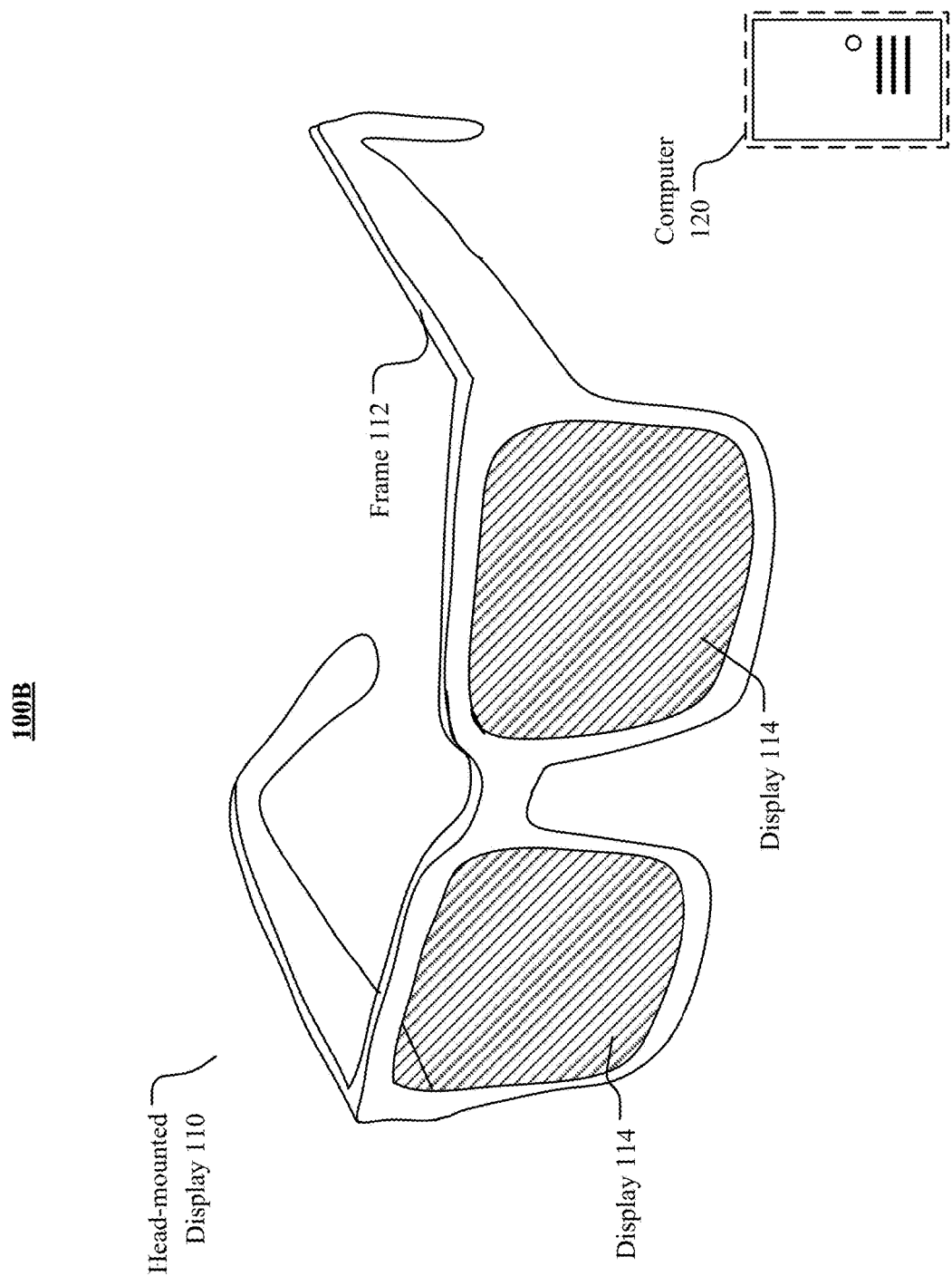
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
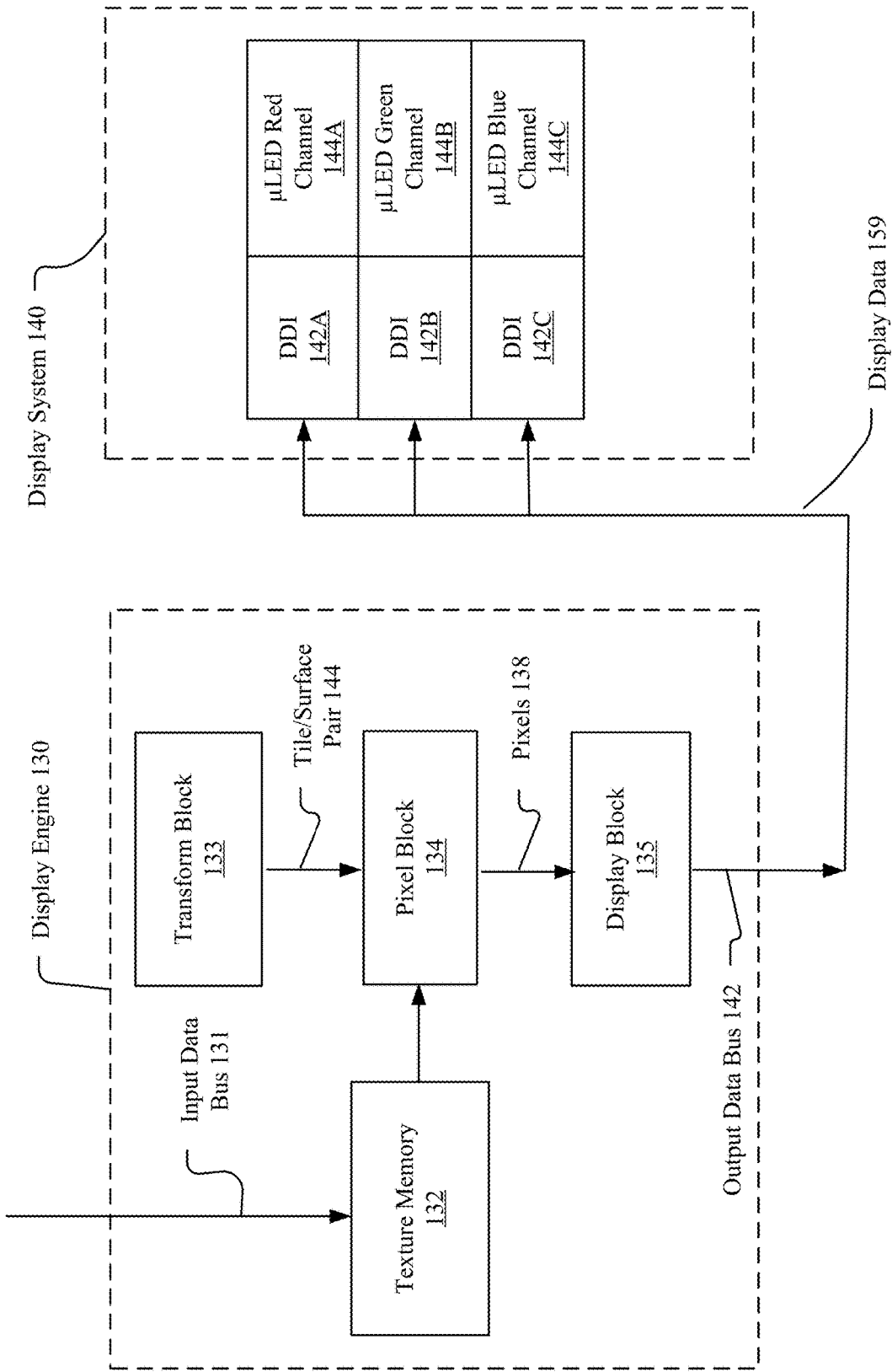
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded into the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (PLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatiotemporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (DDIs) (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), etc.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

Figure 1D:
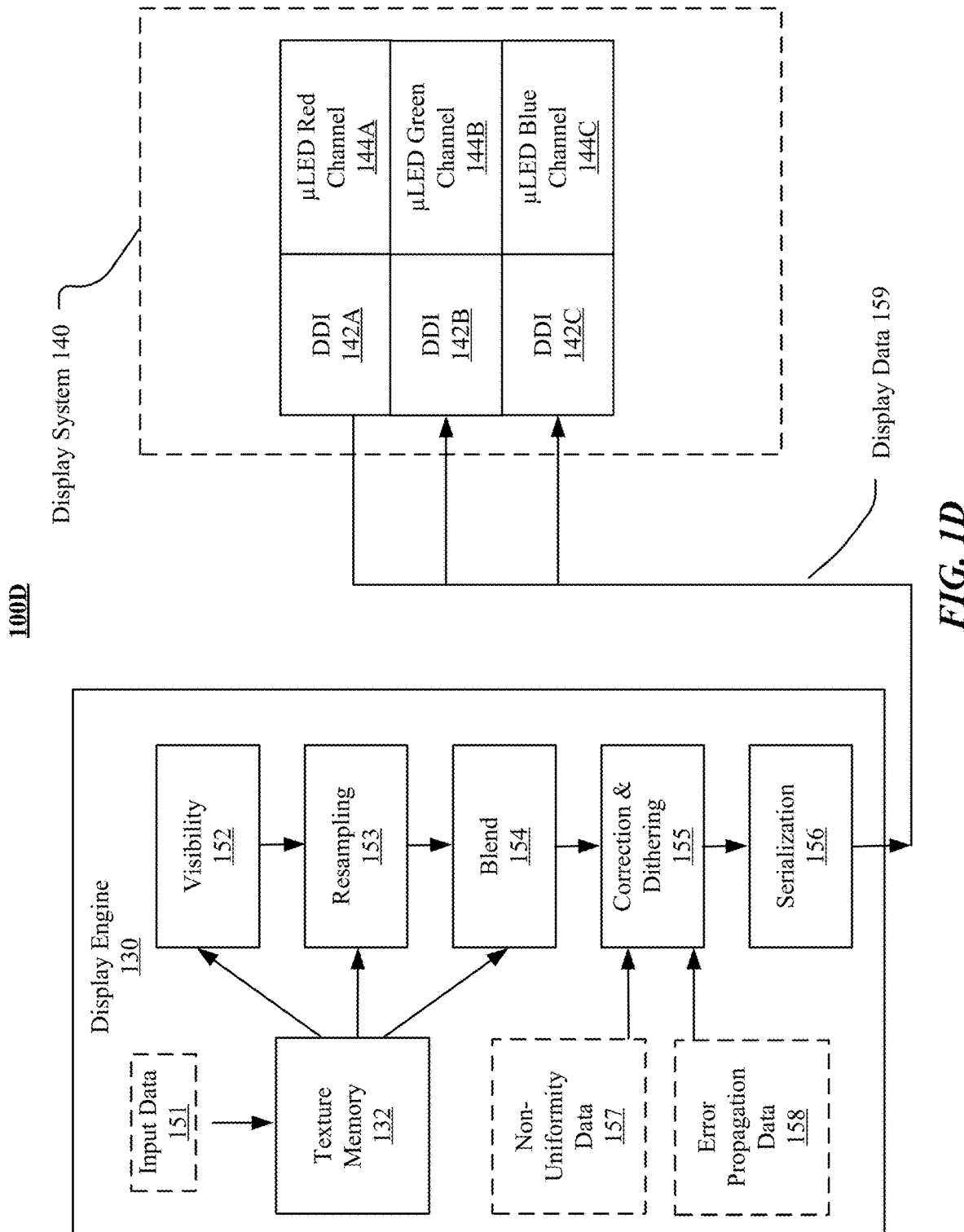
FIG. 1D illustrates an example graphic pipeline of the display engine for generating display image data.

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C) of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values and perform one or more dithering algorithms for dithering the quantization errors (based, in part and in particular embodiments, on non-uniformity data 157 and/or error propagation data 158) both spatially and temporally, serialize the pixel values for scanline output for the physical display, and generate the display data 159 suitable for the display system 140. The display engine 130 may send the display data 159 to the display system 140. In particular embodiments, the display system 140 may include three display driver ICs (e.g., 142A, 142B, 142C) for the pixels of the three color channels of RGB (e.g., 144A, 144B, 144C).

Figure 2A:
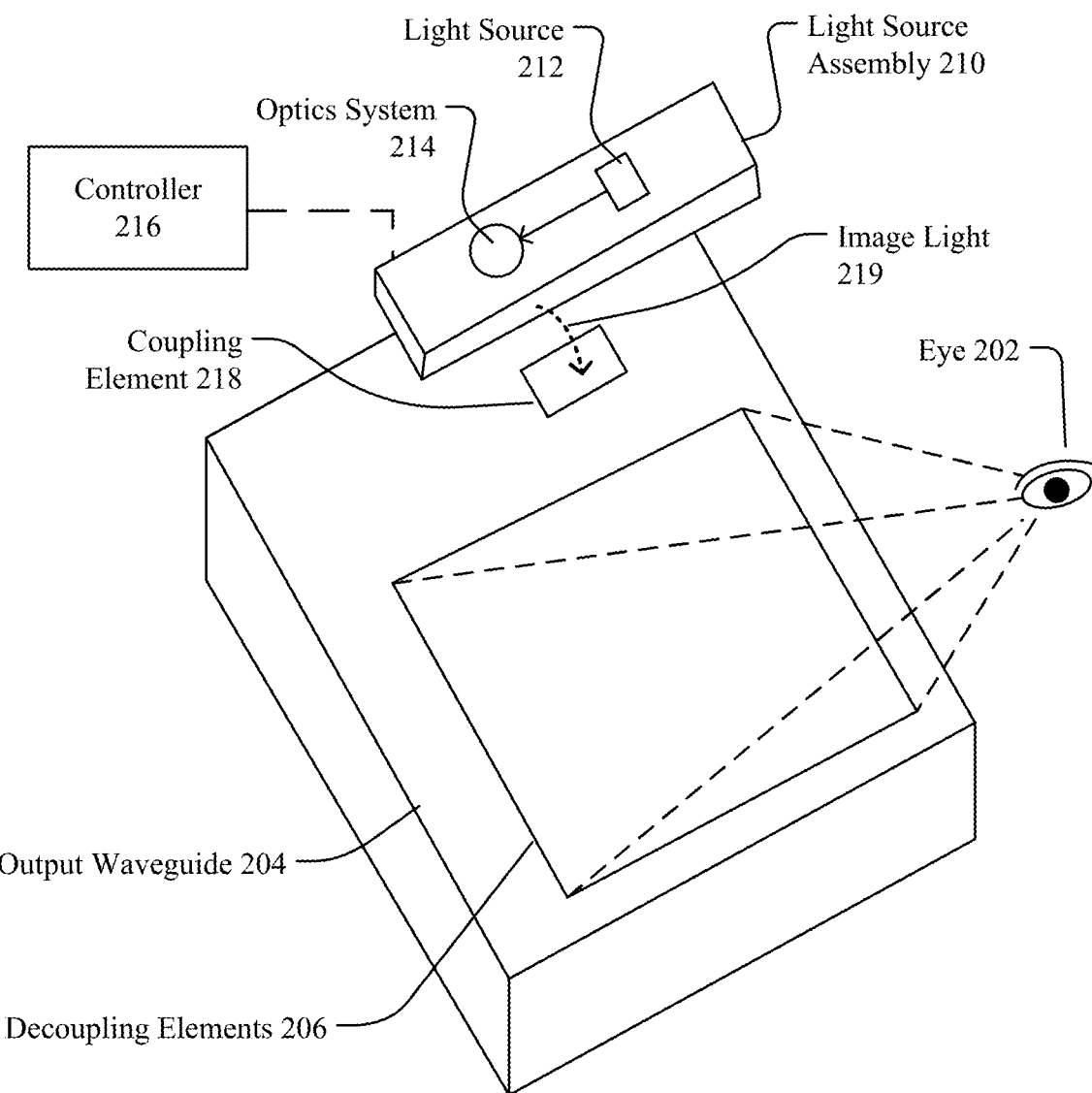
FIG. 2A illustrates an example scanning waveguide display.
Figure 3A:
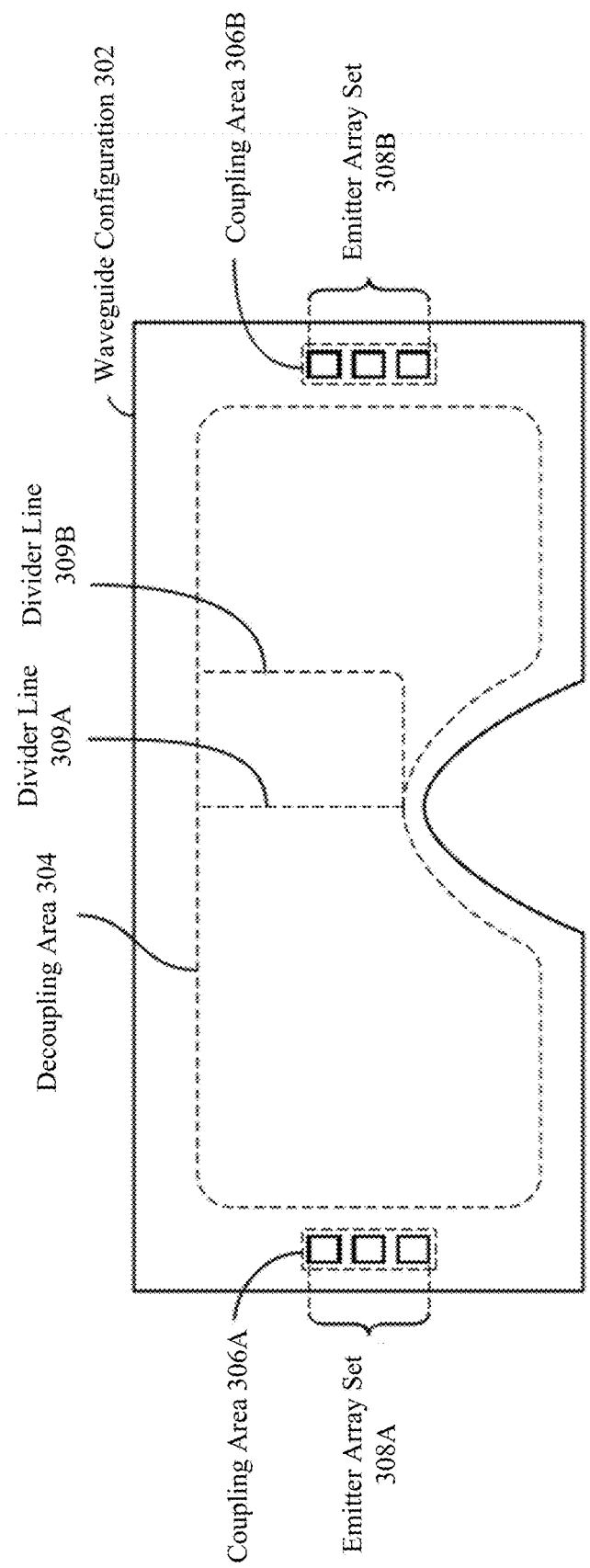
FIG. 3A illustrates an example 2D micro-LED waveguide display.

FIG. 2A illustrates an example scanning waveguide display 200A. In particular embodiments, the head-mounted display (HMD) of the AR/VR system may include a near eye display (NED) which may be a scanning waveguide display 200A. The scanning waveguide display 200A may include a light source assembly 210, an output waveguide 204, a controller 216, etc. The scanning waveguide display 200A may provide images for both eyes or for a single eye. For purposes of illustration, FIG. 3A shows the scanning waveguide display 200A associated with a single eye 202. Another scanning waveguide display (not shown) may provide image light to the other eye of the user and the two scanning waveguide displays may share one or more components or may be separated. The light source assembly 210 may include a light source 212 and an optics system 214. The light source 212 may include an optical component that could generate image light using an array of light emitters. The light source 212 may generate image light including, for example, but not limited to, red image light, blue image light, green image light, infra-red image light, etc. The optics system 214 may perform a number of optical processes or operations on the image light generated by the light source 212. The optical processes or operations performed by the optics systems 214 may include, for example, but are not limited to, light focusing, light combining, light conditioning, scanning, etc.

In particular embodiments, the optics system 214 may include a light combining assembly, a light conditioning assembly, a scanning mirror assembly, etc. The light source assembly 210 may generate and output an image light 219 to a coupling element 218 of the output waveguide 204. The output waveguide 204 may be an optical waveguide that could output image light to the user eye 202. The output waveguide 204 may receive the image light 219 at one or more coupling elements 218 and guide the received image light to one or more decoupling elements 206. The coupling element 218 may be, for example, but is not limited to, a diffraction grating, a holographic grating, any other suitable elements that can couple the image light 219 into the output waveguide 204, or a combination thereof. As an example and not by way of limitation, if the coupling element 350 is a diffraction grating, the pitch of the diffraction grating may be chosen to allow the total internal reflection to occur and the image light 219 to propagate internally toward the decoupling element 206. The pitch of the diffraction grating may be in the range of 300 nm to 600 nm. The decoupling element 206 may decouple the total internally reflected image light from the output waveguide 204. The decoupling element 206 may be, for example, but not limited to, a diffraction grating, a holographic grating, any other suitable element that can decouple image light out of the output waveguide 204, or a combination thereof. As an example and not by way of limitation, if the decoupling element 206 is a diffraction grating, the pitch of the diffraction grating may be chosen to cause incident image light to exit the output waveguide 204. The orientation and position of the image light exiting from the output waveguide 204 may be controlled by changing the orientation and position of the image light 219 entering the coupling element 218. The pitch of the diffraction grating may be in the range of 300 nm to 600 nm.

In particular embodiments, the output waveguide 204 may be composed of one or more materials that can facilitate total internal reflection of the image light 219. The output waveguide 204 may be composed of one or more materials including, for example, but not limited to, silicon, plastic, glass, polymers, or some combination thereof. The output waveguide 204 may have a relatively small form factor. As an example and not by way of limitation, the output waveguide 204 may be approximately 50 mm wide along X-dimension, 30 mm long along Y-dimension and 0.5-1 mm thick along Z-dimension. The controller 216 may control the scanning operations of the light source assembly 210. The controller 216 may determine scanning instructions for the light source assembly 210 based at least on the one or more display instructions for rendering one or more images. The display instructions may include an image file (e.g., bitmap) and may be received from, for example, a console or computer of the AR/VR system. Scanning instructions may be used by the light source assembly 210 to generate image light 219. The scanning instructions may include, for example, but are not limited to, an image light source type (e.g., monochromatic source, polychromatic source), a scanning rate, a scanning apparatus orientation, one or more illumination parameters, or some combination thereof. The controller 216 may include a combination of hardware, software, firmware, or any suitable components supporting the functionality of the controller 216.

Figure 2B:
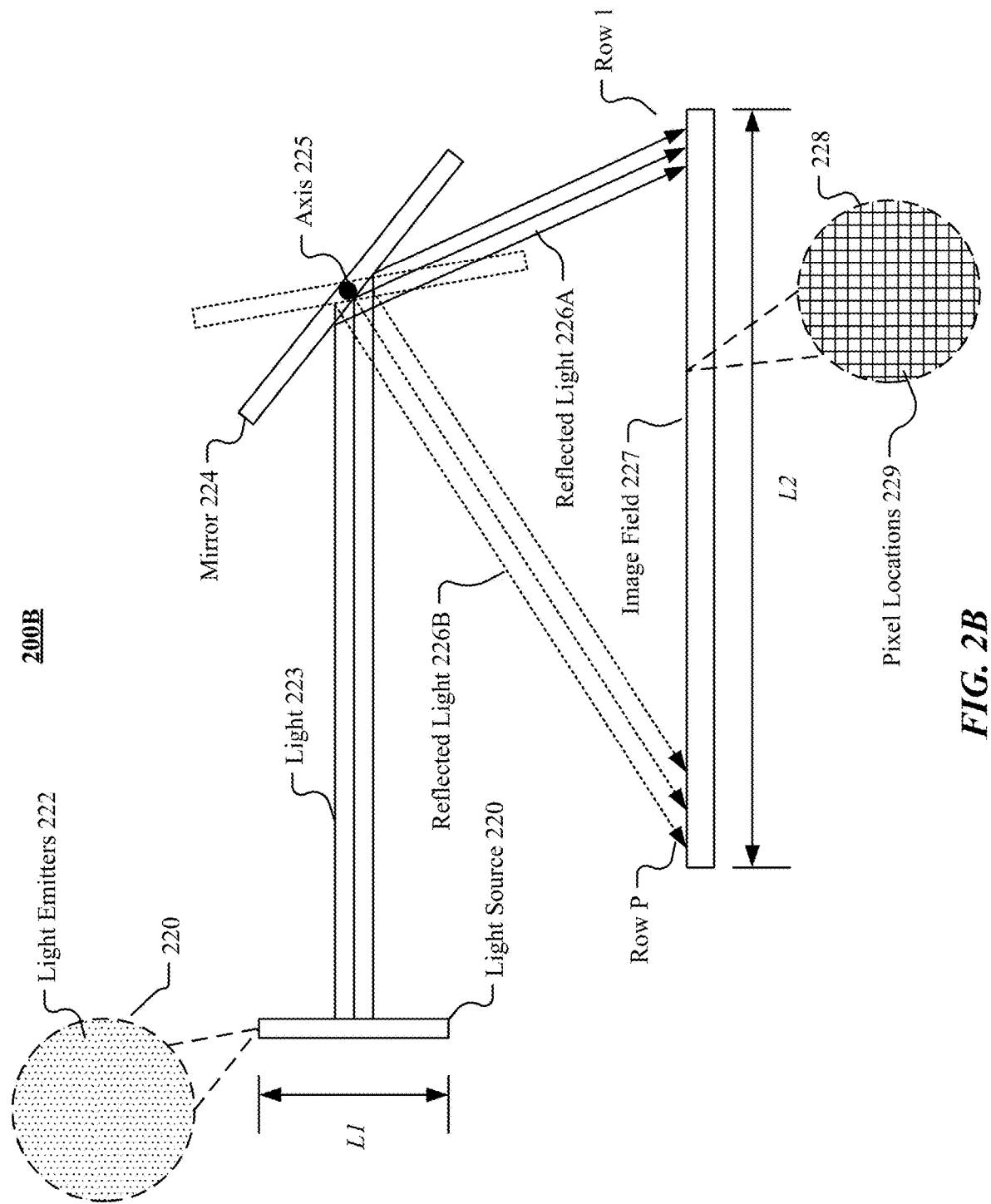
FIG. 2B illustrates an example scanning operation of the scanning waveguide display.

FIG. 2B illustrates an example scanning operation of a scanning waveguide display 200B. The light source 220 may include an array of light emitters 222 (as represented by the dots in inset) with multiple rows and columns. The light 223 emitted by the light source 220 may include a set of collimated beams of light emitted by each column of light emitters 222. Before reaching the mirror 224, the light 223 may be conditioned by different optical devices such as the conditioning assembly (not shown). The mirror 224 may reflect and project the light 223 from the light source 220 to the image field 227 by rotating about an axis 225 during scanning operations. The mirror 224 may be a microelectromechanical system (MEMS) mirror or any other suitable mirror. As the mirror 224 rotates about the axis 225, the light 223 may be projected to a different part of the image field 227, as illustrated by the reflected part of the light 226A in solid lines and the reflected part of the light 226B in dash lines.

In particular embodiments, the image field 227 may receive the light 226A-B as the mirror 224 rotates about the axis 225 to project the light 226A-B in different directions. For example, the image field 227 may correspond to a portion of the coupling element 218 or a portion of the decoupling element 206 in FIG. 2A. In particular embodiments, the image field 227 may include a surface of the coupling element 206. The image formed on the image field 227 may be magnified as light travels through the output waveguide 220. In particular embodiments, the image field 227 may not include an actual physical structure but include an area to which the image light is projected to form the images. The image field 227 may also be referred to as a scan field. When the light 223 is projected to an area of the image field 227, the area of the image field 227 may be illuminated by the light 223. The image field 227 may include a matrix of pixel locations 229 (represented by the blocks in inset 228) with multiple rows and columns. The pixel location 229 may be spatially defined in the area of the image field 227 with a pixel location corresponding to a single pixel. In particular embodiments, the pixel locations 229 (or the pixels) in the image field 227 may not include individual physical pixel elements. Instead, the pixel locations 229 may be spatial areas that are defined within the image field 227 and divide the image field 227 into pixels. The sizes and locations of the pixel locations 229 may depend on the projection of the light 223 from the light source 220. For example, at a given rotation angle of the mirror 224, light beams emitted from the light source 220 may fall on an area of the image field 227. As such, the sizes and locations of pixel locations 229 of the image field 227 may be defined based on the location of each projected light beam. In particular embodiments, a pixel location 229 may be subdivided spatially into subpixels (not shown). For example, a pixel location 229 may include a red subpixel, a green subpixel, and a blue subpixel. The red, green and blue subpixels may correspond to respective locations at which one or more red, green and blue light beams are projected. In this case, the color of a pixel may be based on the temporal and/or spatial average of the pixel's subpixels.

In particular embodiments, the light emitters 222 may illuminate a portion of the image field 227 (e.g., a particular subset of multiple pixel locations 229 on the image field 227) with a particular rotation angle of the mirror 224. In particular embodiment, the light emitters 222 may be arranged and spaced such that a light beam from each of the light emitters 222 is projected on a corresponding pixel location 229. In particular embodiments, the light emitters 222 may include a number of light-emitting elements (e.g., micro-LEDs) to allow the light beams from a subset of the light emitters 222 to be projected to a same pixel location 229. In other words, a subset of multiple light emitters 222 may collectively illuminate a single pixel location 229 at a time. As an example and not by way of limitation, a group of light emitters including eight light-emitting elements may be arranged in a line to illuminate a single pixel location 229 with the mirror 224 at a given orientation angle.

In particular embodiments, the number of rows and columns of light emitters 222 of the light source 220 may or may not be the same as the number of rows and columns of the pixel locations 229 in the image field 227. In particular embodiments, the number of light emitters 222 in a row may be equal to the number of pixel locations 229 in a row of the image field 227 while the light emitters 222 may have fewer columns than the number of pixel locations 229 of the image field 227. In particular embodiments, the light source 220 may have the same number of columns of light emitters 222 as the number of columns of pixel locations 229 in the image field 227 but fewer rows. As an example and not by way of limitation, the light source 220 may have about 1280 columns of light emitters 222 which may be the same as the number of columns of pixel locations 229 of the image field 227, but only a handful rows of light emitters 222. The light source 220 may have a first length L1 measured from the first row to the last row of light emitters 222. The image field 530 may have a second length L2, measured from the first row (e.g., Row 1) to the last row (e.g., Row P) of the image field 227. The L2 may be greater than L1 (e.g., L2 is 50 to 10,000 times greater than L1).

In particular embodiments, the number of rows of pixel locations 229 may be larger than the number of rows of light emitters 222. The display device 200B may use the mirror 224 to project the light 223 to different rows of pixels at different time. As the mirror 520 rotates and the light 223 scans through the image field 227, an image may be formed on the image field 227. In some embodiments, the light source 220 may also has a smaller number of columns than the image field 227. The mirror 224 may rotate in two dimensions to fill the image field 227 with light, for example, using a raster-type scanning process to scan down the rows then moving to new columns in the image field 227. A complete cycle of rotation of the mirror 224 may be referred to as a scanning period which may be a predetermined cycle time during which the entire image field 227 is completely scanned. The scanning of the image field 227 may be determined and controlled by the mirror 224 with the light generation of the display device 200B being synchronized with the rotation of the mirror 224. As an example and not by way of limitation, the mirror 224 may start at an initial position projecting light to Row 1 of the image field 227, and rotate to the last position that projects light to Row P of the image field 227, and then rotate back to the initial position during one scanning period. An image (e.g., a frame) may be formed on the image field 227 per scanning period. The frame rate of the display device 200B may correspond to the number of scanning periods in a second. As the mirror 224 rotates, the light may scan through the image field to form images. The actual color value and light intensity or brightness of a given pixel location 229 may be a temporal sum of the color various light beams illuminating the pixel location during the scanning period. After completing a scanning period, the mirror 224 may revert back to the initial position to project light to the first few rows of the image field 227 with a new set of driving signals being fed to the light emitters 222. The same process may be repeated as the mirror 224 rotates in cycles to allow different frames of images to be formed in the scanning field 227.

Figure 3B:
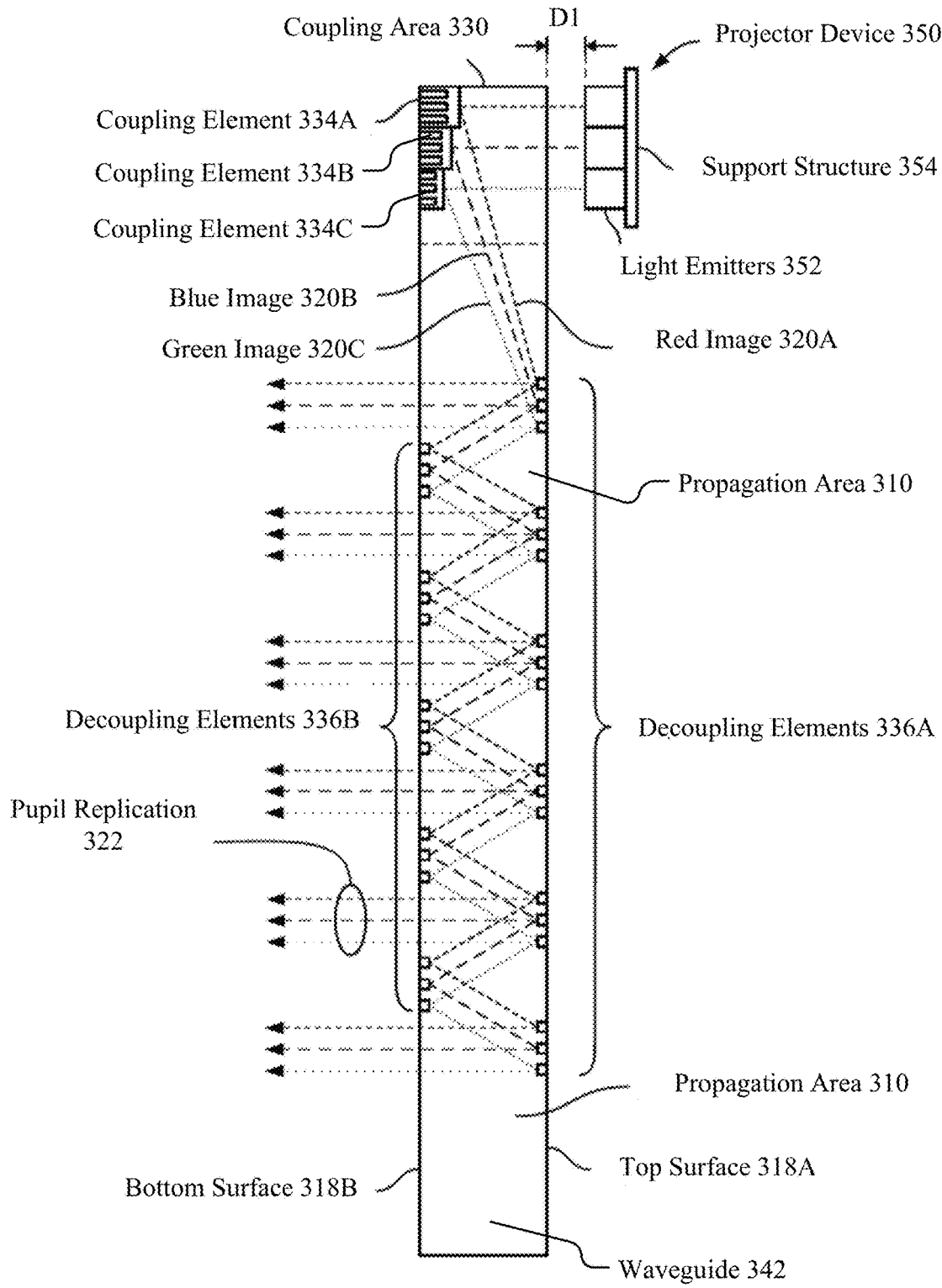
FIG. 3B illustrates an example waveguide configuration for the 2D micro-LED waveguide display.

FIG. 3A illustrates an example 2D micro-LED waveguide display 300A. In particular embodiments, the display 300A may include an elongate waveguide configuration 302 that may be wide or long enough to project images to both eyes of a user. The waveguide configuration 302 may include a decoupling area 304 covering both eyes of the user. In order to provide images to both eyes of the user through the waveguide configuration 302, multiple coupling areas 306A-B may be provided in a top surface of the waveguide configuration 302. The coupling areas 306A and 306B may include multiple coupling elements to receive image light from light emitter array sets 308A and 308B, respectively. Each of the emitter array sets 308A-B may include a number of monochromatic emitter arrays including, for example, but not limited to, a red emitter array, a green emitter array, and a blue emitter array. In particular embodiments, the emitter array sets 308A-B may further include a white emitter array or an emitter array emitting other colors or any combination of any multiple colors. In particular embodiments, the waveguide configuration 302 may have the emitter array sets 308A and 308B covering approximately identical portions of the decoupling area 304 as divided by the divider line 309A. In particular embodiments, the emitter array sets 308A and 308B may provide images to the waveguide of the waveguide configuration 302 asymmetrically as divided by the divider line 309B. For example, the emitter array set 308A may provide image to more than half of the decoupling area 304. In particular embodiments, the emitter array sets 308A and 308B may be arranged at opposite sides (e.g., 180° apart) of the waveguide configuration 302 as shown in FIG. 3B. In other embodiments, the emitter array sets 308A and 308B may be arranged at any suitable angles. The waveguide configuration 302 may be planar or may have a curved cross-sectional shape to better fit to the face/head of a user.

FIG. 3B illustrates an example waveguide configuration 300B for the 2D micro-LED waveguide display. In particular embodiments, the waveguide configuration 300B may include a projector device 350 coupled to a waveguide 342. The projector device 320 may include a number of light emitters 352 (e.g., monochromatic emitters) secured to a support structure 354 (e.g., a printed circuit board or other suitable support structure). The waveguide 342 may be separated from the projector device 350 by an air gap having a distance of D1 (e.g., approximately 50 µm to approximately 500 µm). The monochromatic images projected by the projector device 350 may pass through the air gap toward the waveguide 342. The waveguide 342 may be formed from a glass or plastic material. The waveguide 342 may include a coupling area 330 including a number of coupling elements 334A-C for receiving the emitted light from the projector device 350. The waveguide 342 may include a decoupling area with a number of decoupling elements 336A on the top surface 318A and a number of decoupling elements 336B on the bottom surface 318B. The area within the waveguide 342 in between the decoupling elements 336A and 336B may be referred as a propagation area 310, in which image light received from the projector device 350 and coupled into the waveguide 342 by the coupling element 334 may propagate laterally within the waveguide 342.

The coupling area 330 may include coupling elements (e.g., 334A, 334B, 334C) configured and dimensioned to couple light of predetermined wavelengths (e.g., red, green, blue). When a white light emitter array is included in the projector device 350, the portion of the white light that falls in the predetermined wavelengths may be coupled by each of the coupling elements 334A-C. In particular embodiments, the coupling elements 334A-B may be gratings (e.g., Bragg gratings) dimensioned to couple a predetermined wavelength of light. In particular embodiments, the gratings of each coupling element may exhibit a separation distance between gratings associated with the predetermined wavelength of light and each coupling element may have different grating separation distances. Accordingly, each coupling element (e.g., 334A-C) may couple a limited portion of the white light from the white light emitter array of the projector device 350 if white light emitter array is included in the projector device 350. In particular embodiments, each coupling element (e.g., 334A-C) may have the same grating separation distance. In particular embodiments, the coupling elements 334A-C may be or include a multiplexed coupler.

As illustrated in FIG. 3B, a red image 320A, a blue image 320B, and a green image 320C may be coupled by the coupling elements 334A, 334B, 334C, respectively, into the propagation area 310 and may begin to traverse laterally within the waveguide 342. A portion of the light may be projected out of the waveguide 342 after the light contacts the decoupling element 336A for one-dimensional pupil replication, and after the light contacts both the decoupling elements 336A and 336B for two-dimensional pupil replication. In two-dimensional pupil replication, the light may be projected out of the waveguide 342 at locations where the pattern of the decoupling element 336A intersects the pattern of the decoupling element 336B. The portion of the light that is not projected out of the waveguide 342 by the decoupling element 336A may be reflected off the decoupling element 336B. The decoupling element 336B may reflect all incident light back toward the decoupling element 336A. Accordingly, the waveguide 342 may combine the red image 320A, the blue image 320B, and the green image 320C into a polychromatic image instance which may be referred as a pupil replication 322. The polychromatic pupil replication 322 may be projected to the user's eyes which may interpret the pupil replication 322 as a full color image (e.g., an image including colors addition to red, green, and blue). The waveguide 342 may produce tens or hundreds of pupil replication 322 or may produce a single replication 322.

In particular embodiments, the AR/VR system may use scanning waveguide displays or 2D micro-LED displays for displaying AR/VR content to users. In order to miniaturize the AR/VR system, the display system may need to miniaturize the space for pixel circuits and may have limited number of available bits for the display. The number of available bits in a display may limit the display's color depth or gray scale level, and consequently limit the quality of the displayed images. Furthermore, the waveguide displays used for AR/VR systems may have nonuniformity problem cross all display pixels. The compensation operations for pixel nonuniformity may result in loss on image grayscale and further reduce the quality of the displayed images. For example, a waveguide display with 8-bit pixels (i.e., 256 gray level) may equivalently have 6-bit pixels (i.e., 64 gray level) after compensation of the nonuniformity (e.g., 8:1 waveguide nonuniformity, 0.1% dead micro-LED pixel, and 20% micro-LED intensity nonuniformity).

AR/VR display systems may use pupil replication waveguides to transmit image light to a viewer's eyes. However, the waveguides may have spatially varying non-uniformity for light transmission of each of RGB color channels. This non-uniformity may cause displayed images to have different colors when viewed from different eye positions, and therefore negatively affect user experience. Ideally, a static image viewed from a particular eye position may have its pixel values adjusted to compensate to the waveguide non-uniformity and eliminate the negative visual effect. For example, to compensate for waveguide non-uniformity, images can be corrected prior to being displayed using correction maps determined based on the current eye position. However, since non-uniformity is view-dependent, it may be impractical to pre-generate and store correction maps for every possible eye position. In practice, only a relatively small number of correction maps may be pre-generated for pre-determined eye positions. For a particular eye position, the system may generate correction maps based on measured non-uniform transmission characteristics of the waveguide as viewed from the pre-determined eye positions (i.e., the correction map for the particular eye position may be interpolated from the pre-generated correction maps). In addition, for a sequence of images viewed from different eye positions, an eye tracking system may be needed to measure the eye position of the viewer dynamically to determine the appropriate compensation. The eye tracking system for determining the eye positions may have some problems, such as latency and limitations in accuracy and precision. If the images are directly corrected based on eye positions provided by the eye tracking system, which could be inaccurate or delayed, the corrections made to the images could be inaccurate or incorrect. When this happens, the viewer may observe flicker artifacts in the displayed sequence of images.

Particular embodiments of the system may correct the images to be displayed using correction maps that are generated based on the current eye position as determined using the eye tracking system. The system may generate, and subsequently consume as input data, correction maps for a number of pre-determined eye positions (e.g., corresponding to a 6×6 mesh grid) with respect to the waveguide (e.g., a pupil replicating waveguide). Each correction map may be associated with a particular color channel of a tristimulus color space in which each color is matched under standardized conditions against three reference colors, such as the primary colors red, green, and blue. For example, in particular embodiments, each correction map may be associated with a particular RGB color channel and each pre-determined eye position may be associated with three correction maps, one for each of the RGB color channels. Each correction map may include a 2D array of scaling factors to scale the 2D image pixel values of that particular color channel. If the current eye position (X, Y) does not fall on a pre-determined eye position but instead falls between the grid of pre-determined eye positions, the system may identify sixteen pre-determined eye positions (e.g., a 4×4 array) associated with an area containing the current eye position (X, Y). The system may then apply bicubic interpolation on the respective correction maps associated with the sixteen pre-determined eye positions to generate correction maps (for RGB color channels) for the current eye position. Using this approach, however, when the current eye position is at or near an edge of the eye-box, there may be no samples for the points outside the eye-box with which to perform an interpolation and compute an appropriate correction map. It has been shown through simulation that if those points outside the eye-box are ignored, the quality of the resulting interpolation is degraded.

In one example, data from an eye tracking system was used to simulate operation and correction over the entire eye-box. In this example, the system performing the simulation provided ground truth and eye-tracked pupil estimates to test pupil-based correction schemes, such as the dynamic uniformity correction approach described above, in a simulated pipeline. The dynamic uniformity correction approach performed as expected for the majority of the eye trajectory. However, using the data set from the eye tracking system, much larger errors were observed for the samples close to the edge of the eye-box due to the interpolation scheme described above, in which points outside the eye-box were ignored. In other words, using a representative range of eye motions to test the interpolation scheme described above, corner cases in which this scheme does not work well were identified. In particular, color fringing was observed when the current eye position was inside and near an edge of the eye-box.

In particular embodiments, the system may, alternatively, identify the closest four pre-determined eye positions (e.g., corresponding to a 2×2 array) that are located at the four corners of a mesh grid area containing the current eye position (X, Y). The system may then apply bilinear interpolation on the respective correction maps associated with the four pre-determined eye positions to generate correction maps (for RGB color channels) for the current eye position. The system may use the bilinear interpolation to generate three correction maps for the RGB color channels, respectively, with each correction map being generated based on bilinear interpolation of four correction maps of the same color channel.

The methods described in this application for computing appropriate correction maps given a current eye tracking position at or near an edge of the eye-box may include accessing data associated with points outside the eye-box. One option for obtaining data associated with points outside the eye-box may involve pre-computing correction maps associated with points outside the eye-box. For example, a 6×6 mesh grid of correction maps corresponding to pre-determined eye positions within the eye-box may be extended to be a 10×10 grid that includes samples outside the original 6×6 mesh grid, where the additional samples represent points outside the eye-box. This pre-computed data may be used in interpolations to compute an appropriate correction map when the current eye position is near an edge of the eye-box. This approach may save on run-time computation but may require more memory than other approaches.

Another option for obtaining data associated with points outside the eye-box may include extrapolating, at run-time, the data from pre-computed correction maps associated with points inside the eye-box to generate correction maps associated with points outside the eye-box. For example, an extrapolation on the X-axis may involve computing, based on one or more samples inside and near the edge of the eye-box, a next value on the X-axis outside the eye-box. Similarly, an extrapolation on the Y-axis may involve computing, based on one or more samples inside and near the edge of the eye-box, a next value on the Y-axis outside the eye-box. These computations may use average, weighted average, or median values of existing samples inside and near an edge of the eye-box to generate values for the samples outside the eye-box using bilinear extrapolation, for example. Such extrapolations may be performed on an as-needed basis in order to compute an appropriate correction map when the current eye position is determined to be near an edge of the eye-box.

In general, any of a variety of methods may be used for computing or obtaining correction map data associated with points outside the eye-box. Using that data to compensate for waveguide non-uniformity when the current eye position is near an edge of the eye-box may result in a smoother image correction behavior and a better user experience than when no such data is considered. For example, by compensating the waveguide non-uniformity, particular embodiments of the system may generate and display more realistic images with more accurate and precise colors than displays that do not appropriately correct for such non-uniformity. By using correction maps generated based on current eye positions, particular embodiments of the system may effectively eliminate or reduce the color change artifacts caused by the non-uniformity of the waveguide while the user's eyes are moving in boundary regions with respect to the waveguide. The displayed content may appear to be smoother over time and more resilient to errors in the eye-tracking data.

In particular embodiments, the system may store pre-generated correction maps associated with eye positions within the eye-box and additional correction maps associated with eye positions outside the eye-box in a computer storage. In particular embodiments, the system may use a temporal filter to generate optimized correction maps based on the correction map generated based on the current eye position and correction maps used for correcting preceding frames. In particular embodiments, the system may up-sample the correction maps into a higher spatial resolution that matches the image resolution or display resolution and apply the high-resolution maps to the current frame for display. As a result, the visual artifacts in the displayed sequence of images caused by the waveguide non-uniformity may be eliminated or reduced. In particular embodiments, using a temporal filter and taking into consideration correction maps of preceding frames, particular embodiments of the system may effectively eliminate or reduce the flicker artifacts caused by the non-uniformity compensation that only considers the spatial non-uniformity without considering the temporal domain. By computing and storing pre-generated correction maps with limited resolutions and at limited number of pre-determined eye positions, the system may improve the system efficiency and reduce the usage of computer resources.

In particular embodiments, the AR/VR display systems may use pupil replication waveguides to transmit light to a viewer's eyes for display images or videos to the viewer. The images coupled into the waveguides may be replicated over the field of view. The pupil replication waveguides may have spatially varying properties for transmitting light of different colors and intensity nonuniformity for RGB color channels. As a result, a displayed image (or a portion of the displayed image) may appear to have different colors when being viewed from different eye positions (also referred to as pupil positions). For example, when an image is viewed from a particular eye position, an image region that should be white may appear to be magenta because the transmission of green channel is suppressed by the waveguides when viewed from that particular eye position. In particular embodiments, the system may compensate the waveguide's non-uniformity by adjusting the pixel values of the displayed images based on the current eye positions of the viewer. As an example and not by way of limitation, the system may measure the light transmission characteristics of the waveguides for particular eye positions and generate correction maps based on the measured transmission characteristics of the waveguides for those particular eye positions. Each correction map may include an array of scaling factors for scaling image pixel values of a particular color channel. The system may generate a correction map for each color channel of the RGB color channels. When the viewer's eyes are at those particular eye positions, the system may apply the correction maps on the images to be displayed to adjust the pixel values of these images. An image with adjusted pixel values once displayed may have correct colors when viewed from those particular eye positions with the waveguide non-uniformity effect being eliminated or reduced.

Assuming that the desired full-color image in linear space is characterized by a first matrix P and the color waveguide pattern is characterized by a second matrix W, then the image I as seen by the viewer may be expressed as the following equation:

$$I = P \cdot W \tag{1}$$

The system may compensate the waveguide nonuniformity to reverse the color distortions in the images by modifying the pixel values of the image using correction maps F as determined by the following equation:

$$F = W^{-1} \tag{2}$$

The system may then generate a reasonable approximation to the desired image by applying the correction maps and deriving a corrected image P' in linear space using the following equation:

$$P' = P \cdot F \tag{3}$$

In equation (3) above, the values in F may be in the range of [0, 1]. The image as seen by the viewer may be characterized by the following equation:

$$I = P' \cdot W = (P \cdot F) \cdot W \approx P \tag{4}$$

The approximation may be due to imperfect correction arising from factors such as latency and limited precision and accuracy in eye position measurement, misalignments, eye movements, etc. The correction range may be contained within the value range of F. In particular embodiments, the non-uniformity level may be within a nominal level of 5:1 and the ratio of the maximum F value to the minimum F value may be equal to or less than 5.

In particular embodiments, for a static image to be viewed from a particular eye position, the system may compensate the waveguide non-uniformity by applying the corresponding correction maps to that image to adjust its pixel values. The image with adjusted pixel values once displayed, when being viewed from that particular eye position, may have fewer or no visual artifacts caused by the waveguide non-uniformity. However, for displaying a sequence of images to a viewer and when the viewer's eye positions move within the field of view (e.g., from left to right), the sequence of images may appear to have different colors when viewed from different eye positions. As a result, the waveguide non-uniformity that varies with eye positions may impose both spatial and temporal requirements on the images to be displayed. Unlike the static image which can be effectively compensated in spatial domain (e.g., using the correction maps for particular eye positions), a sequence of images to be viewed from different eye positions may need to be compensated in both spatial and temporal domains. In particular embodiments, for displaying a sequence of images viewed from different eye positions, the system may use an eye tracking system to measure the eye positions of the viewer dynamically and determine corresponding correction maps based on the dynamically measured eye positions.

In some cases, the eye tracking system may have latency problems when measuring the eye positions for dynamic non-uniformity correction. For example, the viewer's eyes may move by a relatively large distance during the time for generating and applying correction maps that are associated with a particular eye position. The viewer's eyes positions as determined by the eye tracking system may fall behind in time with respect to the actual eye positions of the viewer. The system may have a constant or variable time period between a first moment in time when the eye tracking system measures the eye positions and a second moment in time when the corrected frame is actually rendered and displayed. In particular embodiments, the latency of the eye tracking system may be up to 7 ms. Furthermore, the eye tracking system may have limited accuracy (e.g., a constant spatial offset from the ground truth) and limited precision (e.g., a sample-to-sample jitter, a time-varying difference between the ground truth and the eye tracking reading) for measuring the eye positions. In particular embodiments, the precision of the eye tracking system may be 0.086 mm (corresponding to 0.5 degree of the view angle) and the accuracy of the eye tracking system may be 0.125 mm (corresponding to 0.7 degree of the view angle). The accuracy and the precision of the eye tracking system may be independent to each other but may have joint impact on the quality of the displayed images. Spatial artifacts may be affected by the accuracy of the eye tracking system. Temporal artifacts may be affected by both accuracy and precision of the eye tracking system. As a result, if the images are directly corrected based on eye positions provided by the eye tracking system, the compensation made to the images may be inaccurate and non-precise. When this happens, the viewer may observe flicking or flashing artifacts in the displayed images. For example, a constant bias in the eye tracking system reading on the eye positions may result in inaccurate compensation maps. In-precise eye position reading may lead to a higher level of noise in the eye position data and cause the correction maps to be non-smooth in temporal domain (e.g., the difference in correction maps of sequential frames being above a threshold). To solve these problems, particular embodiments of the system may correct the images to be displayed based on correction maps generated based on: (1) the current eye position (as determined using the eye tracking system); and (2) a temporal filter taking into consideration correction maps used for correcting previously frames, as will be described in later sections of this disclosure. Note that while several example embodiments illustrated in the figures and described herein use bicubic interpolation to generate correction maps for a current eye position based on correction maps associated with a collection of predetermined eye positions in an area that contains the current eye position (such as a 4×4 array of predetermined eye positions), in other embodiments, a different type of interpolation may be used to generate correction maps for a current eye position based on correction maps associated with nearby eye positions. For example, while bicubic interpolation may be chosen because it has a continuous first derivative, other interpolation algorithms may be employed that require a different support than the 4×4 support required for a bicubic interpolation. Note also that while several example embodiments illustrated in the figures and described herein generate respective correction maps for each of the three color channels in an RGB color space, in other embodiments, correction maps may be generated for each channel in a different color space. For example, in particular embodiments, correction maps may be generated for each channel in a YCbCr color space, which includes one luminance channel (Y) and two chrominance channels (Cb and Cr), or in a color space in which YCbCr color space values have been compressed to reduce memory requirements. In particular embodiments, each correction map may be associated with a particular color channel of a tristimulus color space (which may subsequently be converted to RGB color space), where a tristimulus implementation could, in theory, handle any number of different collections of primary reference colors. Note that in various embodiments, the respective correction maps generated for each channel of the applicable color space might or might not have the same data resolution. For example, in the case of YCbCr compression, the resolution of the data for the Cb and Cr channels will be half that of the resolution of the data for the Y channel.

Figure 4A:
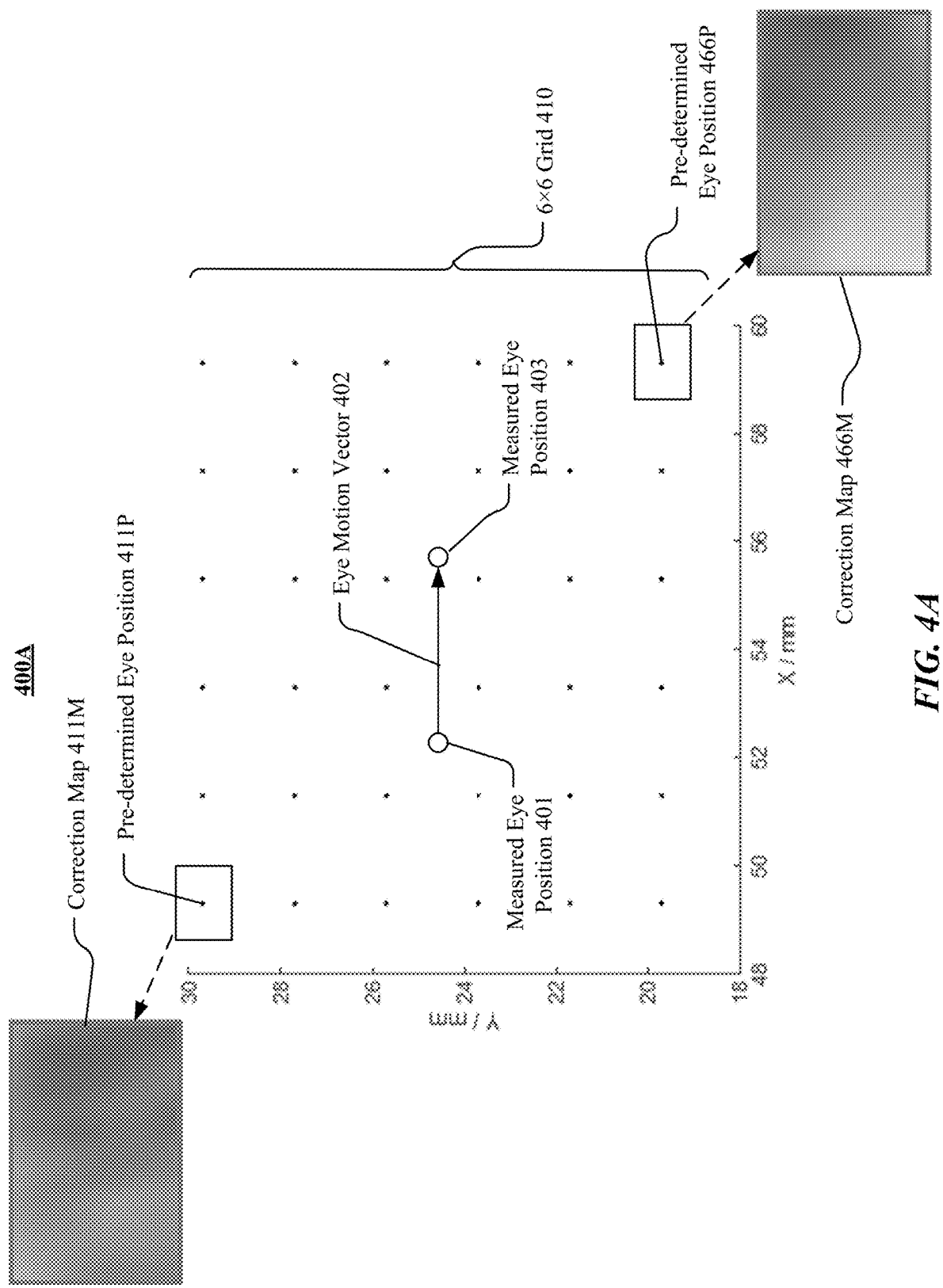
FIG. 4A illustrates an example process for measuring the waveguide non-uniformity and generating correction maps for pre-determined eye positions.

FIG. 4A illustrates an example process 400A for measuring the waveguide non-uniformity and generating correction maps for pre-determined eye positions. In particular embodiments, the system may pre-measure the light transmission characteristics of the waveguides from a number of pre-determined eye positions corresponding to a N×N mesh grid in the field of view of the waveguide (e.g., an eye-box area having a size of 10 mm×10 mm). The system may then generate correction maps for these pre-determined eye positions based on the measured light transmission characteristics. Each correction map may include an array of scaling factors for scaling the pixel values of a particular color channel of images to be displayed. As an example and not by way of limitation, the system may pre-measure the waveguide characteristics (e.g., light transmission characteristics for RGB color channels, color shifting ranges, color distortions, light intensities of different colors, etc.) at the positions corresponding to intersection points of a 6×6 mesh grid 410, as shown in FIG. 4A. Each dot of the mesh grid 410 may correspond to an eye position (e.g., eye position 411P and 466P). Each eye position may correspond to a waveguide model characterizing the light transmission properties of the waveguide as viewed from that particular eye position. For each of these pre-determined eye positions (e.g., 411P and 466P), the system may generate corresponding correction maps (e.g., 411M and 466M) for adjusting pixel values of the images to be displayed. As another example, the system may pre-measure the waveguide characteristics at the positions corresponding to intersection points of a 9×7 mesh grid. In particular embodiments, the waveguide area may have a size of 10 mm×10 mm and may correspond to a field of view of 20 degrees×30 degrees. In particular embodiments, the color non-uniformity of the waveguide may be measured at every point with an interval distance of 2 mm of the waveguide region for generating the corresponding input correction maps. In particular embodiments, the system may generate correction maps for these pre-determined eye positions and store the generated maps in a database and a computer storage. In particular embodiments, the pre-generated correction maps may have relatively low spatial resolutions (e.g., 25 pixels×25 pixels) to minimize the burden on usage of the computer system resources (e.g., storage, memory access, processing power, etc.). The system may up-sample the low-resolution correction maps into a higher resolution that matches the image resolution or display resolution before applying correction maps to the image to be displayed, as will be described later in this disclosure.

In particular embodiments, for correcting a current frame of a sequence of images, the system may first determine the current eye position (X, Y) of the viewer using the eye tracking system. The current eye position (X, Y) may be determined at the beginning of the process for preparing the current frame. The system may compare the current eye position (X, Y) as determined by the eye tracking system to the pre-determined eye positions of the waveguide area (e.g., the eye-box area). When the current eye position (X, Y) falls on one of pre-determined eye positions (e.g., being within a threshold distance to a pre-determined eye position), the system may select the correction maps associated with that particular eye position. The system may access and retrieve the selected correction maps from the database and computer storage. The retrieved correction maps may be used for correcting the current frame to compensate the waveguide non-uniformity, after being processed by the later steps (e.g., a temporal filter and/or an up-sampling algorithm) of a graphic pipeline.

In particular embodiments, the current eye position (X, Y) of the viewer, as determined or measured using the eye tracking system, may not fall on any one of the pre-determined eye positions (e.g., beyond a threshold distance to any pre-determined eye positions) and fall in an area among these pre-determined positions. As an example and not by way of limitation, at a first moment in time, the eye position of the viewer may be located at the eye position 401 as measured or tracked by the eye tracking system and may start to move toward the eye position 403 along the eye motion vector 402. At a second moment in time, the eye position of the viewer may be located at the eye position 403 as measured or tracked by the eye tracking system. The system may need to display two frames of images to the viewer at the first moment and the second moment in time, respectively. The measured eye positions for these two frames may not fall on any pre-determined eye positions in the mesh grid 410. Instead, the measured eye positions 401 and 403 may fall in regions that are among the pre-determined eye positions. The system may generate the correction maps for the measured eye positions 401 and 403 based on interpolation on the pre-generated correction maps of the pre-determined positions.

In particular embodiments, the system may identify sixteen pre-determined eye positions that correspond a 4×4 array and are associated with an area (e.g., a smallest area corresponding to a 4×4 array of pre-determined positions) containing the current eye position (X, Y). The system may then access and retrieve respective correction maps associated with the sixteen pre-determined eye positions from the database. After that, the system may apply bicubic interpolation on the respective correction maps associated with the sixteen pre-determined eye positions to generate correction maps (for RGB color channels) for the current eye position. The system may use the bicubic interpolation to generate three correction maps for the three RGB color channels, respectively, with each correction map being generated based on bicubic interpolation of sixteen correction maps of the same color channel. In particular embodiments, alternatively, the system may identify the closest four pre-determined eye positions (e.g., a 2×2 array) that are located at the four corners of a mesh grid area that contains the current eye position (X, Y). The system may then apply bilinear interpolation on the respective correction maps associated with the four pre-determined eye positions to generate correction maps (for RGB color channels) for the current eye position. The system may use the bilinear interpolation to generate three correction maps for the RGB color channels, respectively, with each correction map being generated based on bilinear interpolation of four correction maps of the same color channel.

Figure 4B:
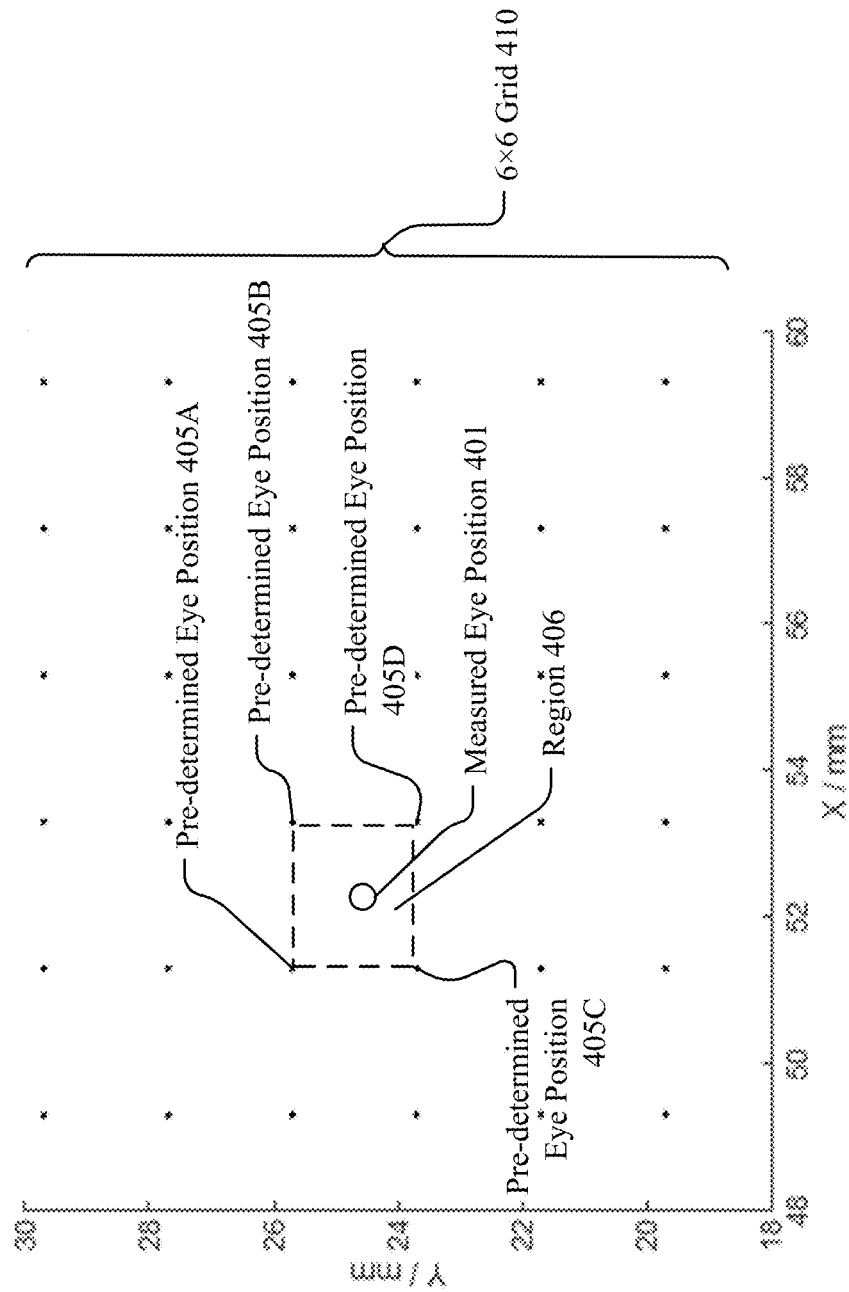
FIG. 4B illustrates an example process for generating correction maps for a current eye position based on bilinear interpolation of pre-generated correction maps.

FIG. 4B illustrates an example process 400B for generating correction maps for a current eye position 401 based on bilinear interpolation of pre-generated correction maps. In general, the values of the two-dimensional correction map may depend on the eye position of the viewer. The waveguide correction pattern may encompass the entire field of view but may be measured for a number of pre-determined eye positions. Reconstructing a correction map for an intermediate eye position of the pre-determined positions may be a four-dimensional interpolation problem including two dimensions for the pupil position and another two dimensions for the spatial waveguide pattern. In particular embodiments, this four-dimensional problem may be reduced to a 2D interpolation given the waveguide region (e.g., an eye-box area) in which the pupil position falls. In particular embodiments, the waveguide region (e.g., the eye-box area) may be sampled at a number of pre-determined points corresponding to a 6×6 mesh grid, as shown in FIGS. 4A through 4E. The system may pre-generate correction maps for these points and store these pre-generated correction maps in a database and a computer storage. At run time, for displaying a current frame of image, the system may first determine or measure the current eye position (X, Y) using the eye tracking system. The system may then identify the closest four pre-determined eye positions (e.g., a 2×2 array) that are located at the four corners of a mesh grid area that contains the current eye position (X, Y). After that, the system may generate the correction maps for the current eye positions based on bilinear interpolation on the respective correction maps associated with the four pre-determined eye positions.

As an example and not by way of limitation, for the measured eye position 401 with coordinates of (X, Y) in the waveguide region (e.g., a 10 mm×10 mm eye-box area), the system may determine the normalized coordinates (x, y) of the measured eye position 401 with respect to the four pre-determined eye positions (e.g., 405A, 405B, 405C, and 405D) associated with the smallest mesh grid region 406 that contains the measured eye position 401. In particular embodiments, the N×N sample points may be indexed as using (i, j) where i is in the range of 1≤i≤N and j is in the range of 1≤j≤N. The pupil location range in the X direction may be [$X_{min}$, $X_{max}$] and the pupil location range in the Y direction may be [$Y_{min}$, $Y_{max}$]. In the example as shown in FIGS. 4A-4B, the eye position range in the X direction may be [49.3 mm, 59.3 mm] and the eye position range in the Y direction may be [19.7 mm, 29.7 mm]. The system may determine two intermediate parameters p and q using the following equations:

$$p=(N-1)(X-X_{min})/(X_{max}-X_{min}) \quad (5)$$

$$q=(N-1)(Y-Y_{min})/(Y_{max}-Y_{min}) \quad (6)$$

The eye position 405C, which is the corner of the mesh grid region 406 with the smallest coordinate values in both X and Y directions among the four corners of the mesh grid region 406, may have its index ($i_C$, $j_C$) as determined using the following equation:

$$i_C=\text{floor}(p) \quad (7)$$

$$j_C=\text{floor}(q) \quad (8)$$

The normalized location (x, y) for the measured eye position 401 with respect to the four associated pre-determined eye positions (e.g., 405A, 405B, 405C, and 405D) may be determined using the following equation:

$$x=p-\text{floor}(p) \quad (9)$$

$$y=q-\text{floor}(q) \quad (10)$$

In equations (9) and (10), floor represents the floor function. The system may then determine the correction maps F for the current eye position (X, Y) based on bilinear interpolation of the correction maps associated with the four pre-determined positions of 405A, 405B, 405C, and 405D. The waveguide correction map F at eye position (X, Y) may be determined using the following equation:

$$F=(1-x)\cdot(1-y)\cdot F_{i,j}+x\cdot(1-y)\cdot F_{i,j}+(1-x)\cdot y\cdot F_{i,j+1}+x\cdot y\cdot F_{i+1,j+1} \quad (11)$$

In equation (11), $F_{i,j}$, $F_{i,j+1}$, $F_{i+1,j}$, and $F_{i+1,j+1}$ are the correction maps that are associated with the pre-determined eye positions of 405C, 405A, 405D, and 405B, respectively. Assuming $F_{00}=F_{i,j}$, $F_{01}=F_{i,j+1}$, $F_{10}=F_{i+1,j}$, and $F_{11}=F_{i+1,j+1}$, the interpolation may be written in a separable form as the following equation:

$$F(X,Y)=(1-y)\cdot a+b\cdot y \quad (12)$$

In equation (12) (x, y) are the normalized coordinates of the eye position (X, Y) with respect to the four corners of the smallest grid region that contains the eye position (X, Y), a and b are the intermediate parameters as determined by the following equations:

$$a=(1-x)\cdot F_{00}+x\cdot F_{01} \quad (13)$$

$$b=(1-x)\cdot F_{10}+x\cdot F_{11} \quad (14)$$

As described herein, dynamic uniformity correction is both a spatial and a temporal problem. Therefore, it may be desirable to implement an interpolation scheme that is immune to artifacts when the selected correction maps change quickly. To do that, it may be important that the first derivative of the interpolation is continuous, otherwise there may be jumps or flickering between images. While bilinear interpolation is commonly used because it is relatively straightforward and easy to implement, at a given sample point, the first derivative is discontinuous. One way to perform interpolation with a continuous first derivative is to use bicubic interpolation. A big advantage of using bicubic interpolation rather than bilinear interpolation is improved spatiotemporal performance due to the continuous first derivative guaranteed by the interpolation algorithm. However, there are some disadvantages, such as 1) it requires significantly greater computational resources than bilinear interpolation and 2) it requires a 4×4 support. In other words, for a given eye position, 4×4 sample support surrounding the given eye position is required in order to perform the interpolation. This approach may be well suited for situations in which the given eye position is in the central portion of the waveguide, where there are two samples side-to-side, left, right, up, down. However, this approach may be harder to implement when the given eye position is in a boundary region near an edge of the waveguide.

Figure 4C:
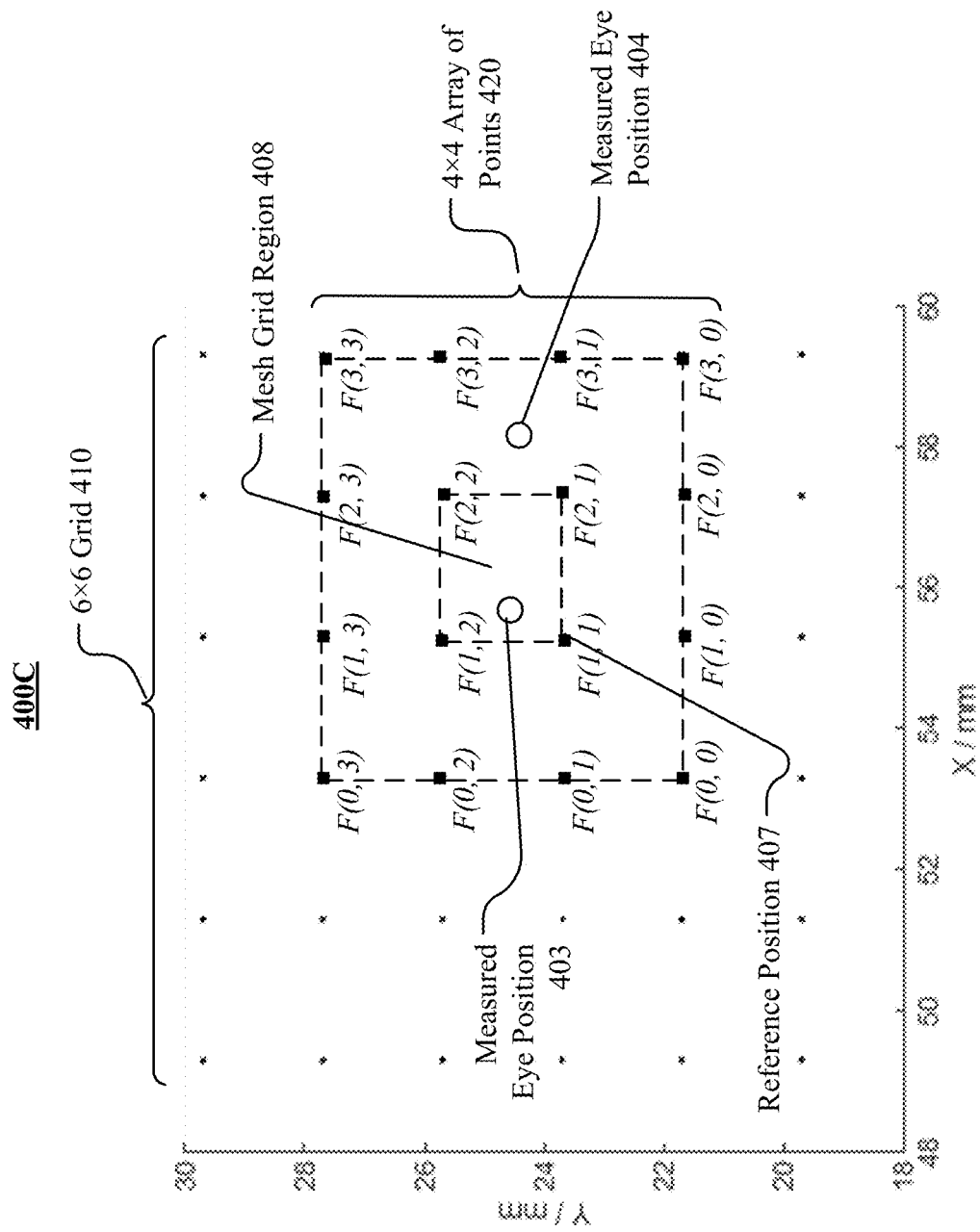
FIG. 4C illustrates an example process for generating correction maps for a current eye position based on bicubic interpolation of pre-generated correction maps.

FIG. 4C illustrates an example process 400C for generating correction maps for a current eye position 403 based on bicubic interpolation of pre-generated correction maps. In particular embodiments, the system may identify sixteen pre-determined eye positions (e.g., a 4×4 array) associated with a smallest area that corresponds to a 4×4 array of pre-determined eye positions and contains the current eye position (X, Y). The system may then apply bicubic interpolation on the respective correction maps associated with the sixteen pre-determined eye positions to generate correction maps (for RGB color channels) for the current eye position (X, Y). The system may use the bicubic interpolation to generate three correction maps for the three RGB color channels, respectively, with each correction map being generated based on bicubic interpolation of sixteen correction maps of the same color channel. In particular embodiments, the system may identify the 4×4 points associated with a current eye position by: (1) first identifying the 2×2 points corresponding to the smallest mesh grid region (e.g., 408) containing the current eye position; (2) identifying a reference point (e.g., 407) corresponding to a corner of the grid region that has the smallest X and Y values among the four corners of the grid region; (3) identifying remaining 15 grid points based on the reference point using the relative positions relationships as shown by the points in the 4×4 array 420 in FIG. 4C. In particular embodiments, the bicubic interpolation may be used in the preferred embodiment for preventing flicker because bicubic interpolation has a continuous first derivative which is helpful for preventing flicker.

As an example and not by way of limitation, for the measured eye position 403, the system may identify a 4×4 array of points 420 in the grid 410 based on the eye position 403 as measured by the eye tracking system. The identified 4×4 points may correspond a smallest 4×4 point-region that contains the measured eye position 403. The system may then perform bicubic interpolation on the correction maps associated with the 4×4 array of points 420 to generate correction maps for the measured eye position 403. The bicubic interpolation may guarantee a continuous first derivative for interpolating the correction maps. Given the eye position (X, Y), which is in the central eye-box area of grid 410, the correction maps for the eye position (X, Y) may be determined using the bicubic interpolation of the following equations:

$$F(X,Y) = b + (y/2) \cdot (c - a + y \cdot (2a - 5b - 4c - d + y \cdot (3b - 3c + d - a))) \quad (15)$$

In equation (15), the parameters a, b, c, and d are determined using the following equations:

$$a = F_{10} + (x/2) \cdot (F_{20} - F_{00} + x \cdot (2F_{00} - 5F_{10} - 4F_{20} - F_{30} + x \cdot (3F_{10} - 3F_{20} + F_{30} - F_{00}))) \quad (16)$$

$$b = F_{11} + (x/2) \cdot (F_{21} - F_{01} + x \cdot (2F_{01} - 5F_{11} - 4F_{21} - F_{31} + x \cdot (3F_{11} - 3F_{21} + F_{31} - F_{01}))) \quad (17)$$

$$c = F_{12} + (x/2) \cdot (F_{22} - F_{02} + x \cdot (2F_{02} - 5F_{12} - 4F_{22} - F_{32} + x \cdot (3F_{12} - 3F_{22} + F_{32} - F_{02}))) \quad (18)$$

$$d = F_{13} + (x/2) \cdot (F_{23} - F_{03} + x \cdot (2F_{03} - 5F_{13} - 4F_{23} - F_{33} + x \cdot (3F_{13} - 3F_{23} + F_{33} - F_{03}))) \quad (19)$$

In equations (15) through (19), $F_{ij}$ are the correction maps at corresponding points of the selected 4×4 points; i and j are in the range of [0, 3]. In one example embodiment, the following extrapolations may be applied to nine corner cases for positions in the boundary region near the edge of the eye-box area:

if j>N−2 and i>N−2:

$$F_{00} = F_{i-1,j-1},\ F_{01} = F_{i-1,j},\ F_{02} = F_{i-1,j+1},\ F_{03} = F_{02} - F_{01}$$

$$F_{10} = F_{i,j-1},\ F_{11} = F_{i,j},\ F_{12} = F_{i,j+1},\ F_{13} = 2F_{12} - F_{11}$$

$$F_{20} = F_{i+1,j-1},\ F_{21} = F_{i+1,j},\ F_{22} = F_{i+1,j+1},\ F_{23} = 2F_{22} - F_{21}$$

$$F_{30} = 2F_{20} - F_{10},\ F_{31} = 2F_{21} - F_{11},\ F_{32} = 2F_{12} - F_{21},$$

$$F_{33} = 4F_{22} - 2(F_{21} + F_{12}) + F_{11}$$

if j>N−2 and i<2:

$$F_{00} = F_{10} - F_{20},\ F_{01} = 2F_{11} - F_{21},\ F_{02} = F_{12} - F_{22},$$

$$F_{03} = 4F_{12} - 2(F_{11} + F_{22}) + F_{21}$$

$$F_{10} = F_{i,j-1},\ F_{11} = F_{i,j},\ F_{12} = F_{i,j+1},\ F_{13} = F_{i,j+2}$$

$$F_{20} = F_{i+1,j-1},\ F_{21} = F_{i+1,j},\ F_{22} = F_{i+1,j+1},\ F_{23} = F_{i+1,j+2}$$

$$F_{30} = F_{i+2,j-1},\ F_{31} = F_{i+2,j},\ F_{32} = F_{i+2,j+1},\ F_{33} = F_{i+2,j+2}$$

if j>N−2 and i≥2 and i≤N−2:

$$F_{00} = F_{i-1,j-1},\ F_{01} = F_{i-1,j},\ F_{02} = F_{i-1,j+1},\ F_{03} = 2F_{02} - F_{01}$$

$$F_{10} = F_{i,j-1},\ F_{11} = F_{i,j},\ F_{12} = F_{i,j+1},\ F_{13} = 2F_{12} - F_{11}$$

$$F_{20} = F_{i+1,j-1},\ F_{21} = F_{i+1,j},\ F_{22} = F_{i+1,j+1},\ F_{23} = 2F_{22} - F_{21}$$

$$F_{30} = F_{i+2,j-1},\ F_{31} = F_{i+2,j},\ F_{32} = F_{i+2,j+1},\ F_3 = 2F_{32} - F_{31}$$

if j<2 and i>N−2:

$$F_{00} = 2F_{01} - F_{02},\ F_{01} = F_{i-1,j},\ F_{02} = F_{i-1,j+1},\ F_{03} = F_{i-1,j+2}$$

$$F_{10} = 2F_{11} - F_{12},\ F_{11} = F_{i,j},\ F_{12} = F_{i,j+1},\ F_{13} = F_{i,j+2}$$

$$F_{20} = 2F_{21} - F_{22},\ F_{21} = F_{i+1,j},\ F_{22} = F_{i+1,j+1},\ F_{23} = F_{i+1,j+2}$$

$$F_{30} = 4F_{21} - 2(F_{11} + F_{22} + F_{12}),\ F_{31} = 2F_{21} - F_{11},$$
$$F_{32} = 2F_{22} - F_{12},$$

$$F_{33} = 2F_{23} - F_{13}$$

if j<2 and i<2:

$$F_{00} = 4F_{11} - 2(F_{21} + F_{12}) + F_{22},\ F_{01} = 2F_{11} - F_{21},$$
$$F_{02} = 2F_{12} - F_{22},$$

$$F_{03} = 2F_{13} - F_{23}$$

$$F_{10} = 2F_{11} - F_{12},\ F_{11} = F_{i,j},\ F_{12} = F_{i,j+1},\ F_{13} = F_{i,j+2}$$

$$F_{20} = 2F_{21} - F_{22},\ F_{21} = F_{i+1,j},\ F_{22} = F_{i+1,j+1},\ F_{23} = F_{i+1,j+2}$$

$$F_{30} = 2F_{31} - F_{32},\ F_{31} = F_{i+2,j},\ F_{32} = F_{i+2,j+1},\ F_{33} = F_{i+2,j+2}$$

if j<2 and i≥2 and i≤N−2:

$F_{00}=2F_{01}-F_{02}$, $F_{01}=F_{i-1,j}$, $F_{02}=F_{i-1,j+1}$, $F_{03}=F_{i-1,j+2}$ $F_{10}=2F_{11}-F_{12}$, $F_{11}=F_{i,j}$, $F_{12}=F_{i,j+1}$, $F_{13}=F_{i,j+2}$ $F_{20}=2F_{21}-F_{22}$, $F_{21}=F_{i+1,j}$, $F_{22}=F_{i+1,j+1}$, $F_{23}=F_{i+1,j+2}$ $F_{30}=2F_{31}-F_{32}$, $F_{31}=F_{i+2,j}$, $F_{32}=F_{i+2,j+1}$, $F_{33}=F_{i+2,j+2}$ if j≥2 and j≤N−2 and i>N−2:

$F_{00}=F_{i-1,j-1}$, $F_{01}=F_{i-1,j}$, $F_{02}=F_{i-1,j+1}$, $F_{03}=F_{i-1,j+2}$ $F_{10}=F_{i,j-1}$, $F_{11}=F_{i,j}$, $F_{12}=F_{i,j+1}$, $F_{13}=F_{i,j+2}$ $F_{20}=F_{i+1,j-1}$, $F_{21}=F_{i+1,j}$, $F_{22}=F_{i+1,j+1}$, $F_{23}=F_{i+2,j+2}$ $F_{30}=2F_{20}-F_{10}$, $F_{31}=2F_{21}-F_{11}$, $F_{32}=2F_{22}-F_{12}$, $F_{33}=2F_{23}-F_{13}$ if j≥2 and j≤N−2 and i<2:

$F_{00}=2F_{10}-F_{20}$, $F_{01}=2F_{11}-F_{21}$, $F_{02}=2F_{12}-F_{22}$, $F_{03}=2F_{13}-F_{23}$ $F_{10}=F_{i,j-1}$, $F_{11}=F_{i,j}$, $F_{12}=F_{i,j+1}$, $F_{13}=F_{i,j+2}$ $F_{20}=F_{i+1,j-1}$, $F_{21}=F_{i+1,j}$, $F_{22}=F_{i+1,j+1}$, $F_{23}=F_{i+1,j+2}$ $F_{10}=F_{i+2,j-1}$, $F_{31}=F_{i+2,j}$, $F_{32}=F_{i+2,j+1}$, $F_{33}=F_{i+2,j+2}$ and if >2 and j≤N−2 and i>2 and i≤N−2:

$F_{00}=F_{i-1,j-1}$, $F_{01}=F_{i-1,j}$, $F_{02}=F_{i-1,j+1}$, $F_{03}=F_{i-1,j+2}$ $F_{10}=F_{i,j-1}$, $F_{11}=F_{i,j}$, $F_{12}=F_{i,j+1}$, $F_{13}=F_{i,j+2}$ $F_{20}=F_{i+1,j-1}$, $F_{21}=F_{i+1,j}$, $F_{22}=F_{i+1,j+1}$, $F_{23}=F_{i+1,j+2}$ $F_{30}=F_{i+2,j-1}$, $F_{31}=F_{i+2,j}$, $F_{32}=F_{i+2,j+1}$, $F_{33}=F_{i+2,j+2}$.

In particular embodiments, the system may generate and apply correction maps to displayed images when the user's eye position is within a central eye-box area of the waveguide area and may not apply correction maps to displayed images when the user's eye position is beyond the central eye-box area. In particular embodiments, the system may determine a central eye-box area within the waveguide area which corresponds to the user's field of view. The central eye-box area may be a sub-area of the waveguide area and may be located at the center area of the waveguide area. In particular embodiments, the central eye-box area may have any suitable shapes or any suitable sizes smaller than the waveguide area. For example, the central eye-box area may be a rectangular sub-area of the waveguide area and may be aligned and co-centered with a rectangular waveguide area. As another example, the central eye-box area may be a circular sub-area at the center area of the waveguide area.

In particular embodiments, for the eye positions within the central eye-box area, such as measured eye position 403 shown in FIG. 4C, the system may select a number of pre-determined eye positions (e.g., an array of eye positions with uniform interval distances) and generate three correction maps (for respective RGB color channels) for each of the pre-determined eye positions. The system may generate these correction maps based on the waveguide transmission characteristics measured at respective pre-determined eye positions. The system may store these pre-generated correction maps in a database. At run time, after determining a current user eye position, the system may first check if the current user eye position is within the central eye-box area.

In response to a determination that the user's eye position is within the central eye-box area, the system may access the pre-generated correction maps and generate a correction map (for each color channel) for the current user eye position using the spatial-interpolating and temporal-averaging methods as described in this disclosure. The system may then apply the correction maps to the displaying images for the current user eye position.

Figure 4D:
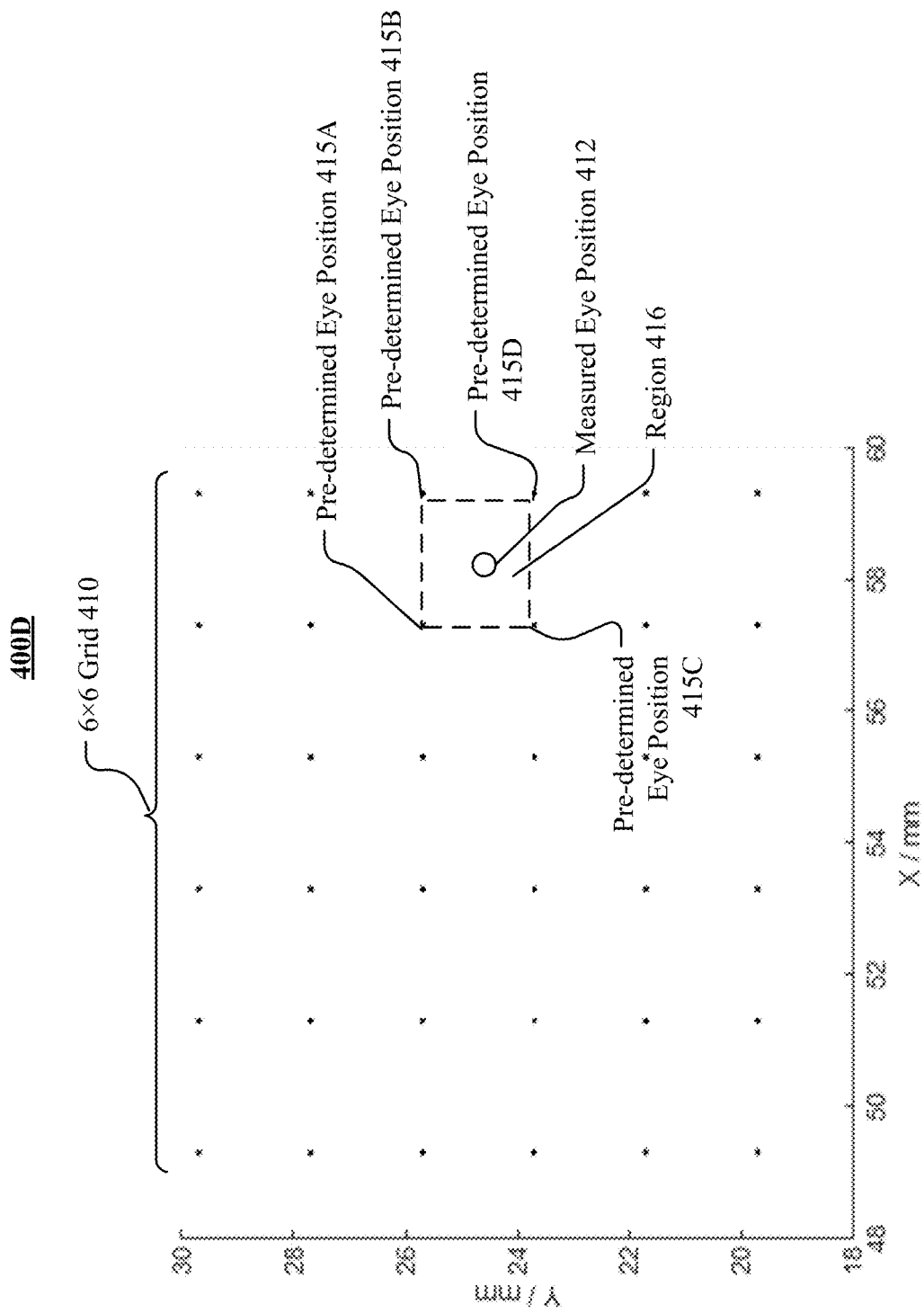
FIG. 4D illustrates an example process for generating correction maps for a current eye position in a boundary region based on bilinear interpolation of pre-generated correction maps.

FIG. 4D illustrates an example process 400D for generating correction maps for a current eye position in a boundary region near an edge of the eye-box based on bilinear interpolation of pre-generated correction maps. In the illustrated example, the current eye position (X, Y) is within a threshold distance to an edge of the waveguide area (e.g., the eye-box area). As an example and not by way of limitation, for the measured eye position 412 with coordinates of (X, Y) in the waveguide region (e.g., a 10 mm×10 mm eye-box area), the system may determine the normalized coordinates (x, y) of the measured eye position 412 with respect to four pre-determined eye positions (e.g., 415A, 415B, 415C, and 415D) associated with the smallest mesh grid region 416 that contains the measured eye position 412. In this example, the correction maps for the measured eye position 412 may be generated in a manner similar to that illustrated in FIG. 4B and described above.

Figure 4E:
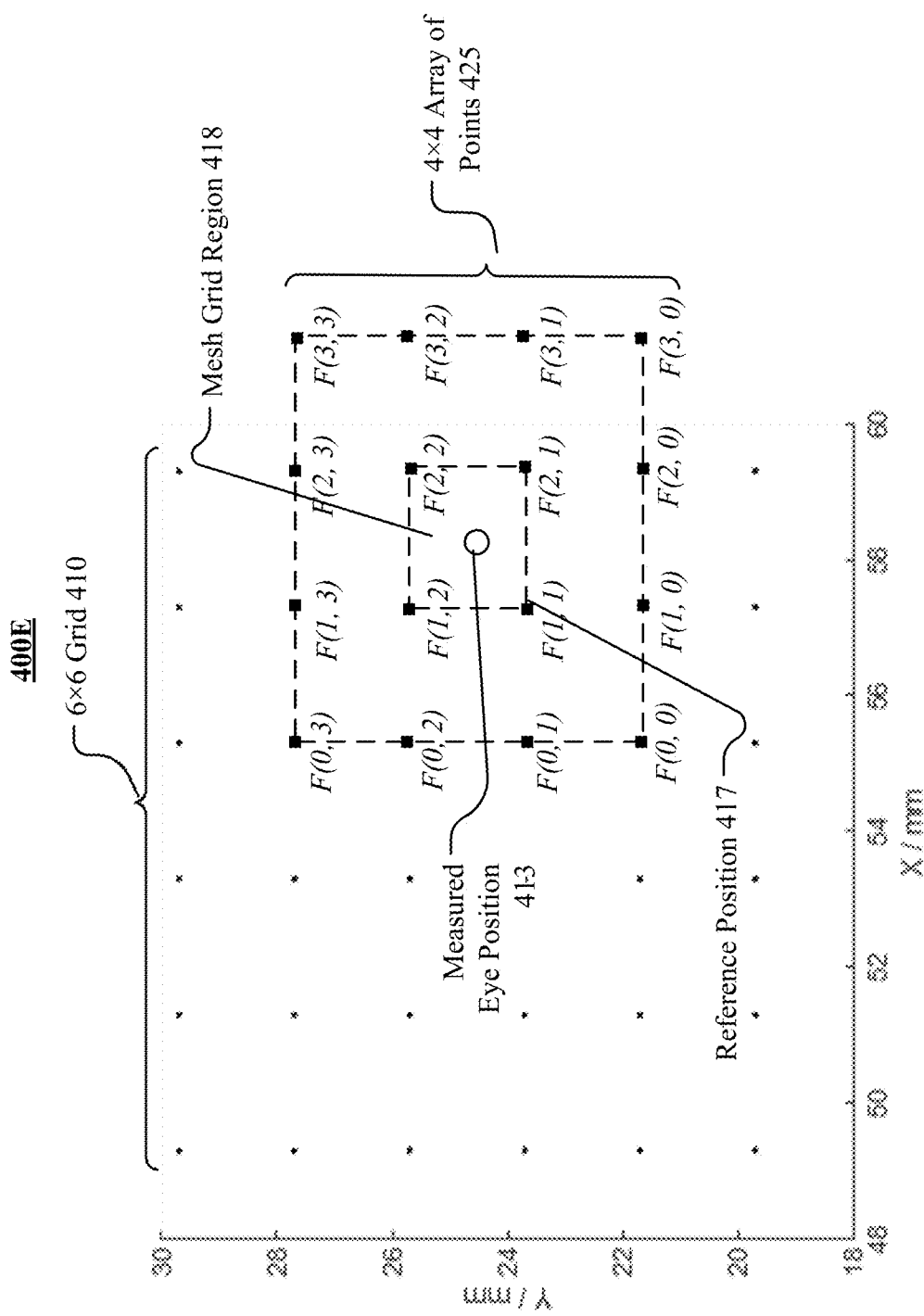
FIG. 4E illustrates an example process for generating correction maps for a current eye position in a boundary region based on bicubic interpolation of pre-generated correction maps.

However, the manner in which correction maps are generated using bicubic interpolation when the measured eye position (e.g., 404 in FIG. 4C) is in a boundary region near an edge of the waveguide area may be different than when the measured eye position (e.g., 403 in FIG. 4C) is in the central region of the waveguide area, as illustrated in FIG. 4C and described above. For example, in some embodiments, in response to a determination that the user's eye position is beyond the central eye-box area, the system might not apply correction maps to the displaying images. As a result, when the user eye position is within the central eye-box area, the user may see the corrected images because of the presence of the correction maps. As the user's eye position moves progressively further from the central eye-box area, the user may see un-corrected images because of the lack of correction data. In particular embodiments, the system may generate a fixed correction map (for each color channel) for a central eye position (instead of a central eye-box area) and apply these fixed correction maps to the displayed images only when the user's eyes is at that central eye position (e.g., within a threshold distance to the center of the waveguide area). When the user's eye position moves away from the central eye position (e.g., beyond a first threshold distance to the center of the waveguide area or within a second threshold distance to an outer edge of the waveguide area), the system might not apply correction maps to the displayed images. Alternatively, when the user's eye position moves away from the central eye position (e.g., beyond a first threshold distance to the center of the waveguide area or within a second threshold distance to an outer edge of the waveguide area), the system may apply correction maps to the displayed images that are based solely on scaling factors associated with eye positions within the waveguide area, thus avoiding referencing samples that do not exist. More specifically, since the support of the bilinear scheme is relatively large, the system could end up referencing waveguide correction pattern samples which go beyond i=6 or i=1, as shown in FIG. 4E and described in more detail below. In one example, to avoid referencing samples which do not exist, and so that only correction maps for sample points up to N=6 must be maintained in memory, constraints may be set as i=min(i, 4) and i=max(i, 2). As a consequence of this approach, there may be fewer waveguide measurements on which to base the interpolation at or near the edges of the eye-box. As previously noted, simulations have shown that if sample points outside the waveguide area are ignored, the quality of the resulting interpolation and non-uniformity correction, is degraded.

In particular embodiments, rather than refraining from applying correction maps to the displayed images or applying correction maps to the displayed images that ignore sample points outside the waveguide area when the current eye position is inside and within a threshold distance to an outer edge of the waveguide area (e.g., the eye-box area), the systems described herein may generate or otherwise obtain additional correction maps for pre-determined eye positions outside the outer edge of the waveguide area, which may improve the resulting interpolation and non-uniformity correction. For example, the system may identify, based on the current eye position, pre-determined internal eye positions inside the outer edge of the waveguide area and pre-determined external eye positions outside the outer edge of the waveguide area, obtain pre-determined arrays of scaling factors associated with the pre-determined internal eye positions, and obtain additional arrays of scaling factors associated with the pre-determined external eye positions. The system may generate a single array of scaling factors based on the pre-determined arrays of scaling factors associated with the pre-determined internal eye positions and the additional arrays of scaling factors associated with the pre-determined external eye positions, adjust pixel values of the current frame based on the generated single array of scaling factors, and output the current frame with the adjusted pixel values to the display.

FIG. 4E illustrates an example process 400E for generating correction maps for a current eye position in a boundary region near an outer edge of the eye-box area based on bicubic interpolation of pre-generated correction maps. In the illustrated example, the current eye position (X, Y), shown as measured eye position 413, is within a threshold distance to an edge of the waveguide area (e.g., the eye-box area). Using the approach illustrated in FIG. 4C and described above, a 4×4 support area around the measured eye position 413 is needed for the bicubic interpolation. This 4×4 support area is shown as a 4×4 array of sample points 425, which includes three points outside the waveguide area (e.g., the eye-box area). These points are labeled in FIG. 4E as F(3,3), F(3,2), and F(3,0). In particular embodiments, rather than simply ignoring these points outside the waveguide area, the system may generate or otherwise obtain additional correction maps for these points, thus improving the resulting interpolation and non-uniformity correction.

In particular embodiments, the system may compute correction maps for these points outside the waveguide area, e.g., using extrapolation, based on the correction maps associated with points inside the waveguide area. For example, if it is assumed that there is a linear relationship between the correction maps associated with points F(1, 3), F(2, 3), and F(3,3) such that the scaling factors in the correction map associated with point F(2,3) are equal to the average of the corresponding scaling factors in the correction maps associated with points F(1,3) and F(3,3), the scaling factors in the correction map for point F(3,3) may be computed based on the known values of the scaling factors in the correction maps associated with points F(1,3) and F(2,3), and so on. In this example, the system may effectively perform bilinear extrapolation of correction maps associated with points inside the waveguide area to generate correction maps associated with points outside the waveguide area. This approach may include generating a correction map associated with external sample point F(3,3) based on correction maps associated with internal sample points F(1,3) and F(2,3), generating a correction map associated with external sample point F(3,2) based on correction maps associated with internal sample points F(1,2) and F(2,2), generating a correction map associated with external sample point F(3,1) based on correction maps associated with internal sample points F(1,1) and F(2,1), and generating a correction map associated with external sample point F(3,0) based on correction maps associated with internal sample points F(1,0) and F(2,0).

Once the correction maps for external sample points F(3,3), F(3,2), F(3,1), and F(3,0) have been computed, a customized correction map for measured eye position 412 may be generated in a manner similar to that illustrated in FIG. 4C and described above, based on the correction maps associated with both the internal sample points and the external sample points in the 4×4 array of points 425. Note that, in particular embodiments, the system may identify the 4×4 points associated with the current eye position (e.g., measured eye position 412) by: (1) first identifying the 2×2 points corresponding to the smallest mesh grid region (e.g., 418) containing the current eye position; (2) identifying a reference point (e.g., 417) corresponding to a corner of the grid region that has the smallest X and Y values among the four corners of the grid region; (3) identifying remaining 15 grid points based on the reference point using the relative positions relationships as shown by the points in the 4×4 array 425 in FIG. 4E.

The example process for generating correction maps for a current eye position in a boundary region near an outer edge of the eye-box area based on bicubic interpolation of pre-generated correction maps shown in FIG. 4E may be relatively simple to implement, as it relies only on shift, addition, and/or subtraction operations and, perhaps more importantly, does not require any additional memory compared to the process for generating correction maps for eye positions in the central region of the eye-box area. Note, however, that there are nine distinct boundary region cases to consider, as follows:

j>N−2, j<2 and otherwise (i.e., j≥2 & j≤N−2)
i>N−2, i<2 and otherwise (i.e., i≥2 & i≤N−2)

Using this approach, the extrapolation calculations may be of the form:

$$Wi+2,j+2=2Wi+1,j+2-Wi,j+2 \text{ or}$$

$$Wi-1,j-1=4Wi,j-2(Wi+1,j+Wi,j+1)+Wi+1,j+1$$

Note that the example illustrated in FIG. 4E and described above assumes a linear relationship between correction maps associated with adjacent sample points in which the scaling factors in a given correction map represent the average of the scaling factors in the correction maps associated with the two sample points on either side of the sample point associated with the given correction map. However, in particular embodiments, the extrapolation performed to generate correction maps for sample points outside the eye-box area may be based on an average of the scaling factors in the correction maps associated with more than two known sample points, or may be based on a weighted average of the scaling factors in the correction maps associated with two or more known sample points, where any arbitrary weights may be assigned as long as they add up to a value of one. In other embodiments, the extrapolation performed to generate correction maps for sample points outside the eye-box area may be based on median values of the scaling factors in the correction maps associated with two or more known sample points. Note also that while the extrapolation performed to generate a correction map for a sample point outside the eye-box area in FIG. 4E may, in essence, be a two-dimensional extrapolation, it is described above in a separable form in which a first extrapolation is performed in the X dimension. In the illustrated example, a second extrapolation may be performed in the Y dimension.

Figure 5A:
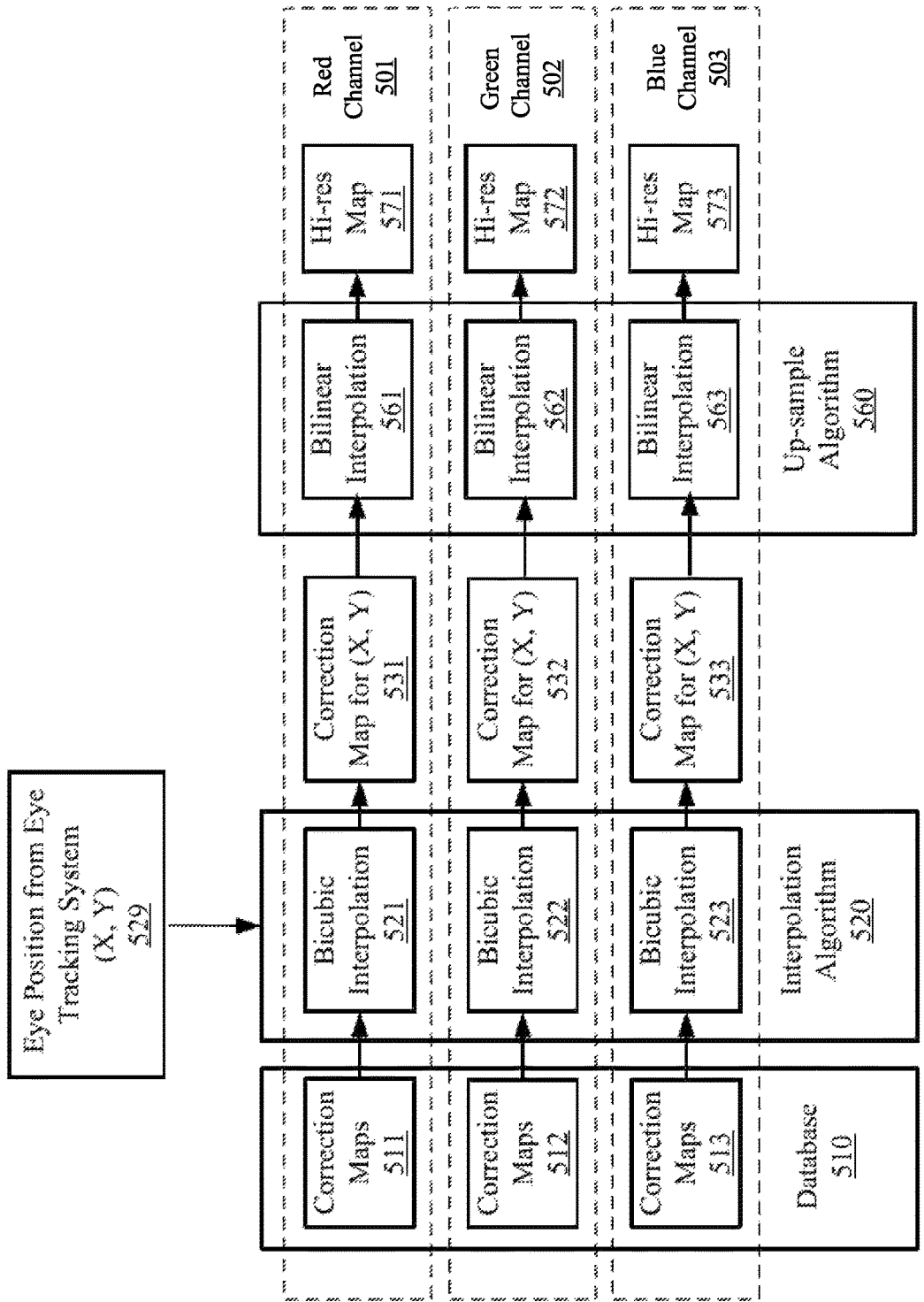
FIG. 5A illustrates an example framework for generating correction maps for a current eye position in a central region of the waveguide area.

FIG. 5A illustrates an example framework 500A for generating correction maps for a current eye position in a central region of the waveguide area. In particular embodiments, the system may use pupil replication waveguides to transmit light to the viewer's eyes for displaying images to the viewer. For displaying a current frame of image, the system may first use an eye tracking system to determine the (X, Y) coordinates of the current eye position 529 of the viewer. The current eye position 529 of the viewer may be with respect to the waveguide region corresponding to an eye-box area (e.g., 10 mm×10 mm). The light transmission properties of the waveguides may be pre-measured at a number of pre-determined positions in the waveguide region corresponding to the eye-box area. The pre-determined positions may correspond to a N×N mesh grid (e.g., 6×6 mesh grid) in the eye-box area. The system may pre-generate three correction maps for each of the pre-determined eye positions of the mesh grid, with each of the three correction maps being associated with a particular color channel. These correction maps may be generated based on the measured light transmission properties of the waveguides at corresponding eye positions. The system may store these pre-generated corrections maps (e.g., 511, 512, and 513) in a database 510 which may be stored in a computer storage. These pre-generated correction maps may have relatively low spatial resolution (e.g., 25 pixels×25 pixels) to reduce the burden on computer resources.

In particular embodiments, the system may receive the (X, Y) coordinates of the current eye position 529 from the eye tracking system and feed that eye position coordinates (X, Y) into the interpolation algorithm 520, which includes bicubic interpolation algorithms 521, 522, 523. The system may identify a 4×4 array of pre-determined eye positions in the N×N mesh grid (e.g., as shown in FIG. 4C) of the eye-box area. The 4×4 array of pre-determined eye positions may be associated with a mesh grid area that contains the current eye position (e.g., as shown in FIG. 4C). The system may retrieve, from the database 510, sixteen groups of pre-generated correction maps associated with the sixteen pre-determined eye positions. Each group of correction maps may be associated with a corresponding pre-determined eye position. Each group of correction maps may include three correction maps (e.g., 511, 512, and 513), including one for each particular color channel of RGB color channels. The interpolation algorithm 520 may perform bicubic interpolation on the retrieved sixteen groups of correction maps and generate one group of correction maps which includes three correction maps (e.g., 531 for the red color channel, 532 for the green color channel, and 533 for the blue color channel) for the current eye position (X, Y) 529.

In particular embodiments, the correction maps generated by the interpolation algorithm 520 may have a relatively low spatial resolution and the system may use a bilinear interpolation process to up-sample the generated correction maps to a higher spatial resolution that matches the image resolution or display resolution (e.g., 1856 pixels×1472 pixels). The system may then apply the high-resolution correction maps, which are generated by the up-sampling process to the current frame (with each high-resolution correction map being applied to one color channel) before outputting the current frame for display. Applying these high-resolution correction maps may cause the pixel values of RGB color channels of the current frame to be adjusted by the corresponding scaling factors in these high-resolution correction maps. As a result, the visual artifacts caused by the waveguide non-uniformity may be eliminated or reduced and the system may have improved efficiency in usage of computer resources (e.g., less storage space being used, less processing power being used, longer battery life, etc.). For example, in embodiments in which the generated correction maps (e.g., 531, 532, and 533) are low-resolution maps, the system may use an up-sampling algorithm 560 to convert the low-resolution correction maps (e.g., 531, 532, and 533) into high-resolution correction maps (e.g., 571, 572, and 573). The up-sampling algorithm 560 may use bilinear interpolation (e.g., 561, 562, and 563) to generate the high-resolution correction maps based on the low-resolution correction maps. The high-resolution maps (e.g., 571, 572, and 573) may have a resolution that matches the resolution of the image to be displayed or the resolution of the display (e.g., 1856 pixels×1472 pixels). After that, the system may apply the three high-resolution correction maps (e.g., 571, 572, and 573) on the current frame of image to be displayed to adjust the pixel values of the current frame image. Each of the three high-resolution maps (e.g., 571, 572, and 573) may be applied to an associated color channel of the current frame of image. The system may output the current frame of image to the pupil replication waveguide of the display. As a result, the current frame of image may be displayed with the influence from the waveguide non-uniformity being eliminated or reduced.

Figure 5B:
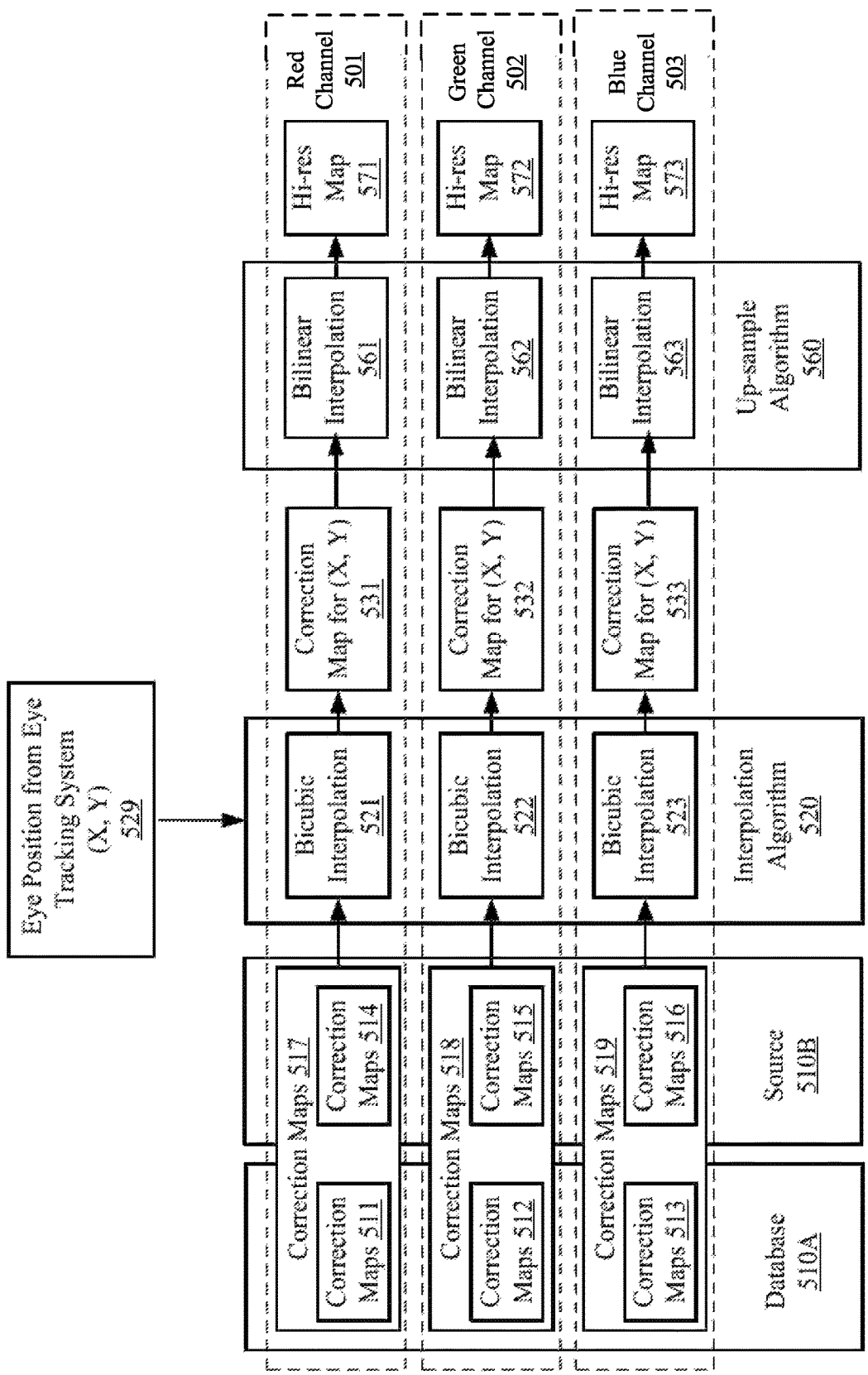
FIG. 5B illustrates an example framework for generating correction maps for a current eye position in a boundary region of the waveguide area.

FIG. 5B illustrates an example framework 500B for generating correction maps for a current eye position in a boundary region inside and near an outer edge of the waveguide region corresponding to the eye-box area. In particular embodiments, the system may use pupil replication waveguides to transmit light to the viewer's eyes for displaying images to the viewer. For displaying a current frame of image, the system may first use an eye tracking system to determine the (X, Y) coordinates of the current eye position 529 of the viewer. The current eye position 529 of the viewer may be with respect to the waveguide region corresponding to an eye-box area (e.g., 10 mm×10 mm). The light transmission properties of the waveguides may be pre-measured at a number of pre-determined positions in the waveguide region corresponding to the eye-box area. The pre-determined positions may correspond to a N×N mesh grid (e.g., 6×6 mesh grid) in the eye-box area. The system may pre-generate three correction maps for each of the pre-determined eye positions of the mesh grid, with each of the three correction maps being associated with a particular color channel. These correction maps may be generated based on the measured light transmission properties of the waveguides at corresponding eye positions. The system may store these pre-generated corrections maps (e.g., 511, 512, and 513) in a database 510 which may be stored in a computer storage. These pre-generated correction maps may have relatively low spatial resolution (e.g., 25 pixels×25 pixels) to reduce the burden on computer resources.

In particular embodiments, the system may receive the (X, Y) coordinates of the current eye position 529 from the eye tracking system and feed that eye position coordinates (X, Y) into the interpolation algorithm 520, which includes bicubic interpolation algorithms 521, 522, and 523. The system may identify a 4×4 array of pre-determined eye positions, some of which are outside the N×N mesh grid (e.g., as shown in FIG. 4E) of the eye-box area. For example, the system may identify pre-determined internal eye positions inside the outer edge of the eye-box area and pre-determined external eye positions outside the outer edge of the eye-box area, where the pre-determined internal eye positions and pre-determined external eye positions collectively form a grid (e.g., a 4×4 array) comprising a pre-determined number of eye positions nearest to the current eye position. The 4×4 array of pre-determined eye positions may be associated with a mesh grid area that contains the current eye position (e.g., as shown in FIG. 4E). The system may retrieve, from the database 510A, which may be stored in a computer storage, groups of pre-generated correction maps associated with the pre-determined internal eye positions. Each group of correction maps may be associated with a corresponding pre-determined internal eye position. Each group of correction maps may include three correction maps (e.g., 511, 512, and 513), including one for each particular color channel of RGB color channels.

In particular embodiments, the system may also obtain additional groups of pre-generated correction maps associated with the pre-determined external eye positions. Each additional group of correction maps may be associated with a corresponding pre-determined external eye position. Each additional group of correction maps may include three correction maps (e.g., 514, 515, and 516), including one for each particular color channel of RGB color channels. In particular embodiments, obtaining the additional groups of correction maps associated with the pre-determined external eye positions may include accessing pre-computed arrays of scaling factors associated with the pre-determined external eye positions from a computer storage (such as source 510B). For example, the additional groups of correction maps associated with the pre-determined external eye positions may include arrays of scaling factors computed based on measured or synthesized non-uniform light transmission characteristics as viewed from the pre-determined external eye positions. In particular embodiments, obtaining the additional groups of correction maps associated with the pre-determined external eye positions may include computing the additional arrays of scaling factors at run-time in response to determining that the current eye position is in a boundary region inside and near an outer edge of the waveguide region corresponding to the eye-box area. Computing the additional arrays of scaling factors may include, for example, accessing pre-computed arrays of scaling factors associated with one or more of the pre-determined internal eye positions from database 510A and extrapolating, in one or more directions, data from the pre-computed arrays of scaling factors associated with the one or more pre-determined internal eye positions to generate the additional arrays of scaling factors. In particular embodiments, the extrapolating may include performing a bilinear extrapolation based on average, weighted average, or median values of scaling factors in the pre-computed arrays of scaling factors associated with the one or more pre-determined internal eye positions.

The interpolation algorithm 520 may perform bicubic interpolation on the retrieved sixteen groups of correction maps, including the groups of pre-generated correction maps associated with the pre-determined internal eye positions (e.g., 511, 512, and 513) and the additional groups of pre-generated correction maps associated with the pre-determined external eye positions (e.g., 514, 515, and 516) and generate one group of correction maps which includes three correction maps (e.g., 531 for the red color channel, 532 for the green color channel, and 533 for the blue color channel) for the current eye position (X, Y) 529.

In particular embodiments, the correction maps generated by the interpolation algorithm 520 may have a relatively low spatial resolution and the system may use a bilinear interpolation process to up-sample the generated correction maps to a higher spatial resolution that matches the image resolution or display resolution (e.g., 1856 pixels×1472 pixels). The system may then apply the high-resolution correction maps, which are generated by the up-sampling process to the current frame (with each high-resolution correction map being applied to one color channel) before outputting the current frame for display. Applying these high-resolution correction maps may cause the pixel values of RGB color channels of the current frame to be adjusted by the corresponding scaling factors in these high-resolution correction maps. As a result, the visual artifacts caused by the waveguide non-uniformity may be eliminated or reduced and the system may have improved efficiency in usage of computer resources (e.g., less storage space being used, less processing power being used, longer battery life, etc.). For example, in embodiments in which the generated correction maps (e.g., 531, 532, and 533) are low-resolution maps, the system may use an up-sampling algorithm 560 to convert the low-resolution correction maps (e.g., 531, 532, and 533) into high-resolution correction maps (e.g., 571, 572, and 573). The up-sampling algorithm 560 may use bilinear interpolation (e.g., 561, 562, and 563) to generate the high-resolution correction maps based on the low-resolution correction maps. The high-resolution maps (e.g., 571, 572, and 573) may have a resolution that matches the resolution of the image to be displayed or the resolution of the display (e.g., 1856 pixels×1472 pixels). After that, the system may apply the three high-resolution correction maps (e.g., 571, 572, and 573) on the current frame of image to be displayed to adjust the pixel values of the current frame image. Each of the three high-resolution maps (e.g., 571, 572, and 573) may be applied to an associated color channel of the current frame of image. The system may output the current frame of image to the pupil replication waveguide of the display. As a result, the current frame of image may be displayed with the influence from the waveguide non-uniformity being eliminated or reduced.

In particular embodiments, to display a sequence of images, the system may use the eye tracking system to determine the viewer's eye position for each frame of the sequence of images and generate correction maps based on the corresponding eye position for each frame. Depending on the frame rate of the images and the moving speed of the viewer's eyes, the viewer's eye position may have moved for a relatively large distance (e.g., larger than a threshold distance) during the time period between two sequential frames. As a result, the correction maps for a first frame and the correction maps for a second frame subsequent to the first frame may be quite different due to the relatively large distance between the measured eye positions for the first frame and the second frame. As a result, even if the generated correction maps work well to compensate the waveguide non-uniformity for the first and second frames separately, the viewer may encounter a flickering visual effect because of the relatively large difference in the correction maps.

To solve this problem, in particular embodiments, the system may use a temporal filter to take into consideration not only the correction maps for the current frame but also the correction maps that are used for correction preceding frames. In particular embodiments, the system may retrieve, from a computer storage, previous correction maps that are used for correcting preceding frames. The system may then use a temporal filter to generate, for each color channel, an optimized correction map based on the correction map generated for the current eye position (e.g., based on bilinear or bicubic interpolation on the pre-generated correction maps corresponding a N×N grid in the waveguide region) and the retrieved correction maps used for correcting the preceding frames. The system may then use the optimized correction map (after the up-sampling process as will described in later sections) to adjust the image pixel values of the images to be displayed to compensate the waveguide non-uniformity. In particular embodiments, the optimized correction map may be an average correction map generated based on an average or weighted average of the correction map generated for the current eye position (e.g., based on bilinear or bicubic interpolation on the pre-generated correction maps corresponding a N×N grid in the waveguide region) and one or more previous correction maps used for correcting the preceding frames. In particular embodiments, the optimized correction map may be generated using a probabilistic estimation method based on the correction map generated for the current eye position (e.g., based on bilinear or bicubic interpolation on the pre-generated correction maps corresponding a N×N grid in the waveguide region) and one or more previous correction maps used for correcting the preceding frames.

As an example and not by way of limitation, the system may determine an optimized correction map, for each color channel, based on the correction map generated for the current eye position based on interpolation of pre-generated correction maps associated with pre-determined internal eye positions and additional correction maps associated with pre-determined external eye positions (as shown in FIG. 5B and described above), and a correction map used for a proceeding frame. As another example, the system may determine an optimized correction map, for each color channel, based on the correction map generated for the current eye position based on interpolation of pre-generated correction maps associated with pre-determined internal eye positions and additional correction maps associated with pre-determined external eye positions (as shown in FIG. 5B and described above), and two correction maps associated with two proceeding frames. As an example and not by way of limitation, the system may determine an optimized correction map, for each color channel, based on the correction map generated for the current eye position based on interpolation of pre-generated correction maps associated with pre-determined internal eye positions and additional correction maps associated with pre-determined external eye positions (as shown in FIG. 5B and described above), and three correction maps associated with three proceeding frames. As an example and not by way of limitation, the system may determine an optimized correction map, for each color channel, based on the correction map generated for the current eye position based on interpolation of pre-generated correction maps associated with pre-determined internal eye positions and additional correction maps associated with pre-determined external eye positions (as shown in FIG. 5B and described above), and any or all the previous correction maps associated with all proceeding frames of the current frame.

In particular embodiments, the temporal filter may determine the optimized correction map using a direct average or weighted average on the correction map generated for the current eye position, and one or more previously correction maps used for correcting one or more preceding frames. For example, a scaling factor in the optimized correction map may be an average of corresponding scaling factors (e.g., scaling factors of the same index in respective maps) of the correction map generated for the current eye position, and one or more previously correction maps used for correcting preceding frames. As another example, a scaling factor in the optimized correction map may be a weighted average of corresponding scaling factors (e.g., scaling factors of the same index in respective maps) of the correction map generated for the current eye position and one or more previously correction maps used for correcting preceding frames. As yet another example, the scaling factors in the optimized correction map may be determined using a probabilistic estimation method based on corresponding scaling factors (e.g., scaling factors of the same index in respective maps) of the correction map generated for the current eye position and one or more previously correction maps used for correcting preceding frames. In particular embodiments, by using the optimized correction maps generated by the temporal filter, the system may reduce the difference between the correction maps for correcting sequential frames of images. The sequential frames of images as corrected by respective optimized correction maps may have a smooth transition visual effect in which sharp changes in intensity caused by the difference in the correction maps are eliminated or reduced. As a result, the displayed content may appear smoother over time and may be more resilient to errors in the eye-tracking data.

In particular embodiments, the correction maps generated for the current eye position may have a relatively low spatial resolution. Similarly, the previous correction maps associated with preceding frames that are stored in the computer storage may also have a relatively low spatial resolution to reduce the burden of the computer resource usage. As a result, the optimized correction map, which is generated by the temporal filter based on the correction map for the current eye position of the current frame and the correction maps associated with preceding frames, may also have a relatively low-resolution. In particular embodiments, the low-resolution maps may have a spatial resolution of 25 pixels×25 pixels corresponding to a 25×25 array of scaling factors. It is notable that the spatial resolution of 25 pixels×25 pixels is for example purpose and the correction map resolution is not limited thereto. For example, the correction map may have any suitable resolutions that allow the correction maps to be stored and processed with reasonable amount of computer resources. In particular embodiments, since the optimized correction maps generated by the temporal filter may have a relatively low spatial resolution, the system may use a bilinear interpolation process to up-sample the optimized correction maps to a higher spatial resolution that matches the image resolution or display resolution (e.g., 1856 pixels×1472 pixels). The system may then apply the high-resolution correction maps, which are generated by the up-sampling process to the current frame (with each high-resolution correction map being applied to one color channel) before outputting the current frame for display. Applying these high-resolution correction maps may cause the pixel values of RGB color channels of the current frame to be adjusted by the corresponding scaling factors in these high-resolution correction maps. As a result, the visual artifacts caused by the waveguide non-uniformity may be eliminated or reduced and the system may have improved efficiency in usage of computer resources (e.g., less storage space being used, less processing power being used, longer battery life, etc.).

Figure 5C:
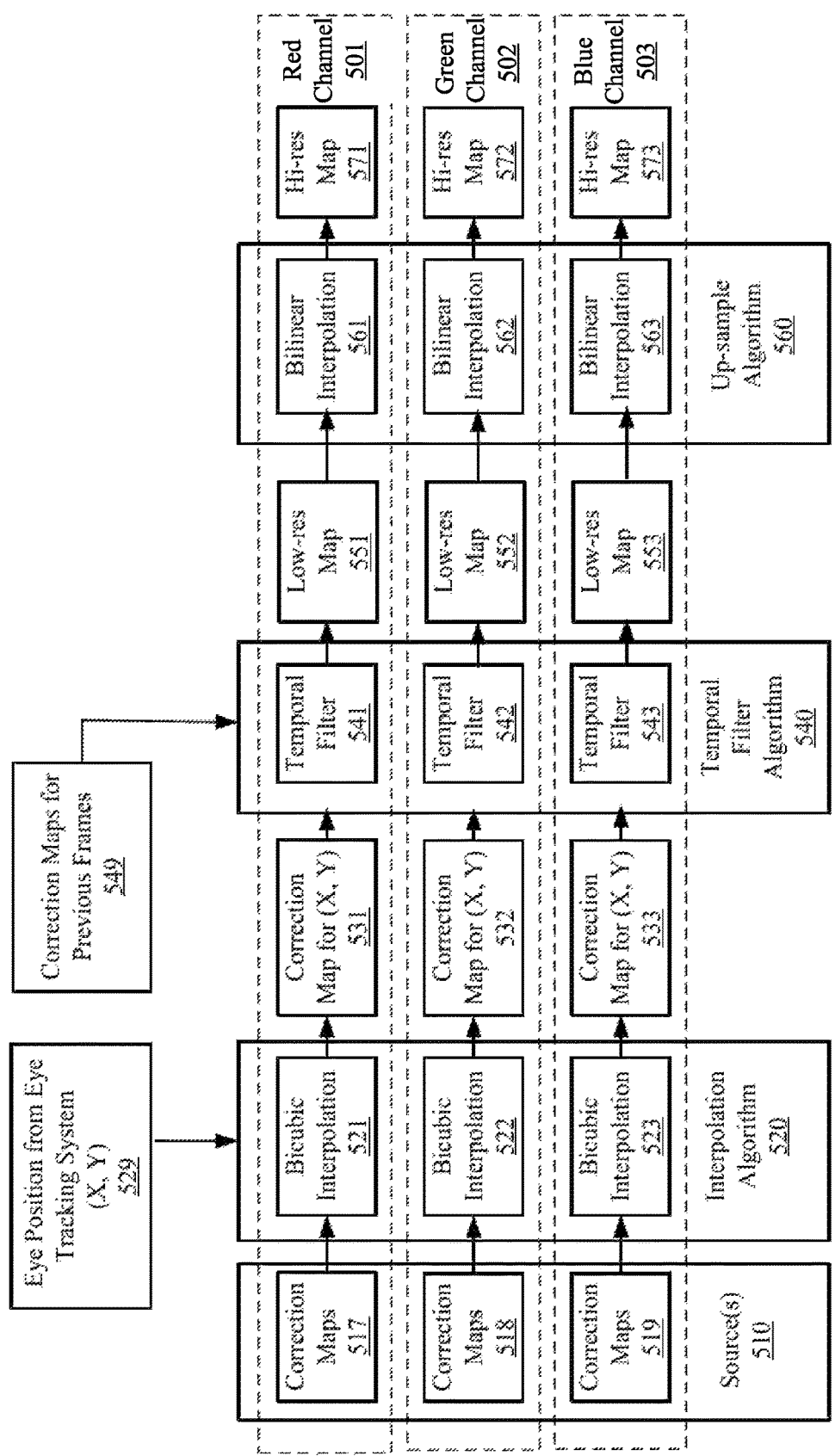
FIG. 5C illustrates an example framework for generating correction maps for a current eye position in a boundary region of the waveguide area including temporal filtering.

FIG. 5C illustrates an example framework 500C for generating correction maps for a current eye position in a boundary region inside and near an outer edge of the waveguide region corresponding to the eye-box area including temporal filtering. In particular embodiments, the system may use pupil replication waveguides to transmit light to the viewer's eyes for displaying images to the viewer. For displaying a current frame of image, the system may first use an eye tracking system to determine the (X, Y) coordinates of the current eye position 529 of the viewer. The current eye position 529 of the viewer may be with respect to the waveguide region corresponding to an eye-box area (e.g., 10 mm×10 mm). The light transmission properties of the waveguides may be pre-measured at a number of pre-determined positions in the waveguide region corresponding to the eye-box area. The pre-determined positions may correspond to a N×N mesh grid (e.g., 6×6 mesh grid) in the eye-box area.

In particular embodiments, the system may receive the (X, Y) coordinates of the current eye position 529 from the eye tracking system and feed that eye position coordinates (X, Y) into the interpolation algorithm 520, which includes bicubic interpolation algorithms 521, 522, and 523. The system may identify a 4×4 array of pre-determined eye positions, some of which are outside the N×N mesh grid (e.g., as shown in FIG. 4E) of the eye-box area. For example, the system may identify pre-determined internal eye positions inside the outer edge of the eye-box area and pre-determined external eye positions outside the outer edge of the eye-box area, where the pre-determined internal eye positions and pre-determined external eye positions collectively form a grid (e.g., a 4×4 array) comprising a pre-determined number of eye positions nearest to the current eye position. The 4×4 array of pre-determined eye positions may be associated with a mesh grid area that contains the current eye position (e.g., as shown in FIG. 4E). The system may access corrections maps (e.g., 517, 518, and 519) from various sources 510, one of which may be a database stored in a computer storage. These correction maps may include groups of pre-generated correction maps associated with the pre-determined internal eye positions (such as correction maps 511, 512, and 513 illustrated in FIG. 5B and described above) and additional groups of pre-generated correction maps associated with the pre-determined external eye positions (such as correction maps 514, 515, and 516 illustrated in FIG. 5B and described above). For example, correction maps 517 may include pre-generated correction maps 511 and additional correction maps 514, correction maps 518 may include pre-generated correction maps 512 and additional correction maps 515, and correction maps 519 may include pre-generated correction maps 513 and additional correction maps 516. Each group of correction maps may include three correction maps, including one for each particular color channel of RGB color channels. These correction maps may have relatively low spatial resolution (e.g., 25 pixels×25 pixels) to reduce the burden on computer resources.

The interpolation algorithm 520 may perform bicubic interpolation on the accessed sixteen groups of correction maps, including the groups of pre-generated correction maps associated with the pre-determined internal eye positions and the additional groups of pre-generated correction maps associated with the pre-determined external eye positions, and generate one group of correction maps which includes three correction maps (e.g., 531 for the red color channel, 532 for the green color channel, and 533 for the blue color channel) for the current eye position (X, Y) 529.

In particular embodiments, during the running process, the system may store previous correction maps (in a low-resolution format) associated with preceding frames in a computer storage. For displaying the current frame of image, the system may access and retrieve the correction maps for previous frames 549 from the computer storage and use a temporal filter algorithm 540 (which includes the temporal filter 541, 542, and 543) to generate three optimized correction maps (e.g., 551, 552, and 553) for the current frame. Each optimized correction map may have relatively low spatial resolution (e.g., 25×25) and may be associated with a particular color channel of RGB (e.g., the low-resolution map 551 for red color channel 501, the low-resolution map 552 for green color channel 502, the low-resolution map 553 for blue color channel 503). In particular embodiments, each optimized correction map may be an average or weighted average of a corresponding correction map generated for the current eye position (X, Y) by the interpolation algorithm 520 and one or more previous correction maps (of the same color channel) that are associated with one or more preceding frames. In particular embodiments, the optimized correction maps may be generated using a probabilistic estimation method based on the corresponding correction map generated for the current eye position (X, Y) by the interpolation algorithm 520 and one or more previous correction maps (of the same color channel) that are associated with one or more preceding frames. Because the correction maps (e.g., 551, 552, and 553) generated by the temporal filter algorithm 540 are low-resolution maps, the system may use an up-sampling algorithm 560 to convert the low-resolution correction maps (e.g., 551, 552, and 553) into high-resolution correction maps (e.g., 571, 572, and 573). The up-sampling algorithm 560 may use bilinear interpolation (e.g., 561, 562, and 563) to generate the high-resolution correction maps based on the low-resolution correction maps. The high-resolution maps (e.g., 571, 572, and 573) may have a resolution that matches the resolution of the image to be displayed or the resolution of the display (e.g., 1856 pixels× 1472 pixels). After that, the system may apply the three high-resolution correction maps (e.g., 571, 572, and 573) on the current frame of image to be displayed to adjust the pixel values of the current frame image. Each of the three high-resolution maps (e.g., 571, 572, and 573) may be applied to an associated color channel of the current frame of image. The system may output the current frame of image to the pupil replication waveguide of the display. As a result, the current frame of image may be displayed with the influence from the waveguide non-uniformity being eliminated or reduced.

In particular embodiments, for displaying a current frame, the system may use an eye tracking system to determine the current eye position of the viewer, generate correction maps for that eye position, and apply the correction maps to the current frame to adjust the image pixel values before outputting the image to display. However, generating correction maps and applying correction maps to the image may take certain amount of time. If the viewer's eye moves rapidly, the eye position of the viewer may have moved for a relatively large distance (e.g., larger than a threshold distance) during that time period of determining the eye position, generating and applying the correction maps to the image. At the moment when the image is actually displayed, the eye position of the viewer may be at a second position which is different from the eye position (e.g., by a threshold distance) that is provided by the eye tracking system and is used for generating the correction maps. As a result, the displayed image, even adjusted by the correction maps, may still have artifacts caused by the waveguide non-uniformity.

To solve this problem, in particular embodiments, the system may predict where the eye position will be at the moment when the image is actually displayed (after being adjusted by the correction maps). In particular embodiments, the system may predict the eye position based on a predicted moving path or a moving trajectory of the eye position for a future period of time (e.g., 1~100 ms) from the current moment in time. For example, the system may determine the moving velocity and moving direction (e.g., using the eye tracking data) and calculate the predicted moving path or moving trajectory of the viewer's eye position based on the moving velocity and moving direction. As another example, the system may identify one or more trends of the eye tracking data and predict the moving path or moving trajectory of the viewer's eye position based on the identified trends of the eyes tracking data. As another example, the system may predict the moving path or moving trajectory of the eye position based on the context of the displayed content (e.g., the content is designed to be viewed in a particular order following a particular path, the user is following a moving object).

In particular embodiments, the prediction may be made at the beginning moment of the process for preparing the current frame for display. The system may then calculate a predicted eye position for the moment in time when the image will actually be displayed. The predicted eye position may be based on the current eye position as measured by the eye tracking system, the predicted moving trajectory, and the amount of time that is needed for generating the correction maps and applying the correction maps to the image. The predicted eye position may be much closer to the ground truth of the actual eye position at the moment when the image is actually displayed. Therefore, instead of using the eye tracking system reading directly for generating correction maps, the system may use the predicted eye position (corresponding to the moment in time when the image will actually be displayed) to generate the correction maps. As a result, the correction maps generated based on the predicted eye position may correct the image and compensate the waveguide non-uniformity more effectively.

As example and not by way of limitation, for displaying a current frame, the system may use the eye tracking system to measure the current eye position at a first moment in time corresponding to the beginning for preparing the current frame for display. The system may determine that, based on trends of the eye tracking data, the viewer's eye position is moving toward a particular direction along a straight line and with a first velocity. The system may predict a moving path of the eye position for a particular period of time (e.g., a time period corresponding to the time interval of two or more sequential frames). The system may then calculate the predicted eye position for the moment in time when the image will be actually displayed. The system may calculate the predicted eye position based on the current eye position at the first moment in time as measured by the eye tracking system, the predicted moving path of the eye position, and a time period corresponding to the amount of time for generating correction maps and applying the correction maps to the image. The system may then generate the correction maps (e.g., using bicubic interpolation on pre-generated correction maps) for the predicted eye position corresponding to the moment when the image will be actually displayed. After that, the system may use a temporal filter to generate a group of optimized correction maps based on the correction maps for the predicted eye position and one or more previous correction maps associated with one or more preceding frames. The system may then up-sample the optimized correction maps to a higher resolution that matches the image resolution or display resolution and apply the high-resolution correction maps to the image before outputting the image for display. As a result, the influence of the waveguide non-uniformity on the visual effect may be effectively compensated.

In particular embodiments, the system may predict the moving path or moving trajectory of the viewer's eye position for a future time period covering one or more future frames. The system may predict, based on the predicted moving path or moving trajectory, the viewer's eye positions at any moments in time during this time period. The system may predict the viewer's eye position for the current frame, for a half-frame moment in time, for the next frame, and other subsequent frames, etc. The system may then generate correction maps for the current frame and one or more subsequence future frames. In particular embodiments, the system may not only feed the previous correction maps used for correcting previous frames into the temporal filter but also feed the correction maps for one or more subsequent future frames into the temporal filter to generate the temporal optimized correction maps (the temporally smoothed correction maps). The temporal optimized correction maps may allow the displayed images to further reduce the artifacts caused by the waveguide non-uniformity and enable a smoother transition visual effect between frames.

In particular embodiments, the system may operate with a frame rate of 90 Hz. In particular embodiments, the system may further reduce the visual artifacts caused by the waveguide non-uniformity by increasing the frame rate. A higher frame rate may correspond to a shorter time period between two sequential frames. Given the same moving velocity of the eye position, a shorter time period between two sequential frames may corresponding to a smaller moving distance for the eye position during that time period. Thus, the correction maps for sequential frames may have smaller amount of difference, and consequently lead to a smoother transition visual effect between the sequential frames.

In particular embodiments, the system may further reduce the artifacts caused by the waveguide non-uniformity by updating the correction maps multiple times per frame. As an example and not by way of limitation, the system may measure the current eye position at a first moment corresponding to the beginning of preparing a current frame for display. The system may calculate a predicted eye position for a future moment after the time period needed for generating and applying the correction maps. The system may generate and apply the correction maps to the current frame of image, as described in the other sections of this disclosure. Before actually outputting the corrected image, the system may measure the current eye position again and compare the measured current eye position and the predicted eye position used for generating the currently used correction maps. Even though the newly measured eye position may still have its own errors due to the measurement latency, the newly measured eye position may be closer to the ground truth of the eye position (e.g., within reasonable distance to the actual eye position of this moment) because of the absence of the steps of generating and applying the correction maps. When the measured current eye position and the predicted eye position are close to each other (e.g., within a threshold distance), the system may move forward to output the corrected current frame. When the measured current eye position and the predicted eye position are quite far from each other (e.g., beyond a threshold distance), the system may calculate a newly predicted eye position, and re-generate the correction map based on the newly predicted eye position, and re-apply these correction maps to the images. This system may repeat this process until the predicted eye position and the later measured eye position are within the threshold distance to each other. The system may then move forward to output the corrected current frame. Because the correction maps could be updated multiple time per frame, the correction maps may have a level of error due to the reduced error in the predicted eye position. As a result, the visual artifact caused by the waveguide non-uniformity may be further reduced. In embodiments in which a predicted position is in a boundary region inside and near an outer edge of the waveguide region corresponding to the eye-box area, the generation of a correction map for the predicted position may be based on both pre-generated correction maps for eye positions inside the waveguide and additional correction maps for eye positions outside the waveguide, as described herein. In particular embodiments, the system may further reduce the artifacts caused by the waveguide non-uniformity by operating with a relatively short frame illumination time (e.g., persistence). This approach may reduce the amount of time for which the eye tracker needs to estimate the eye path through the eye-box area, such that not as much error is able to accrue during the eye movement.

Figure 6:
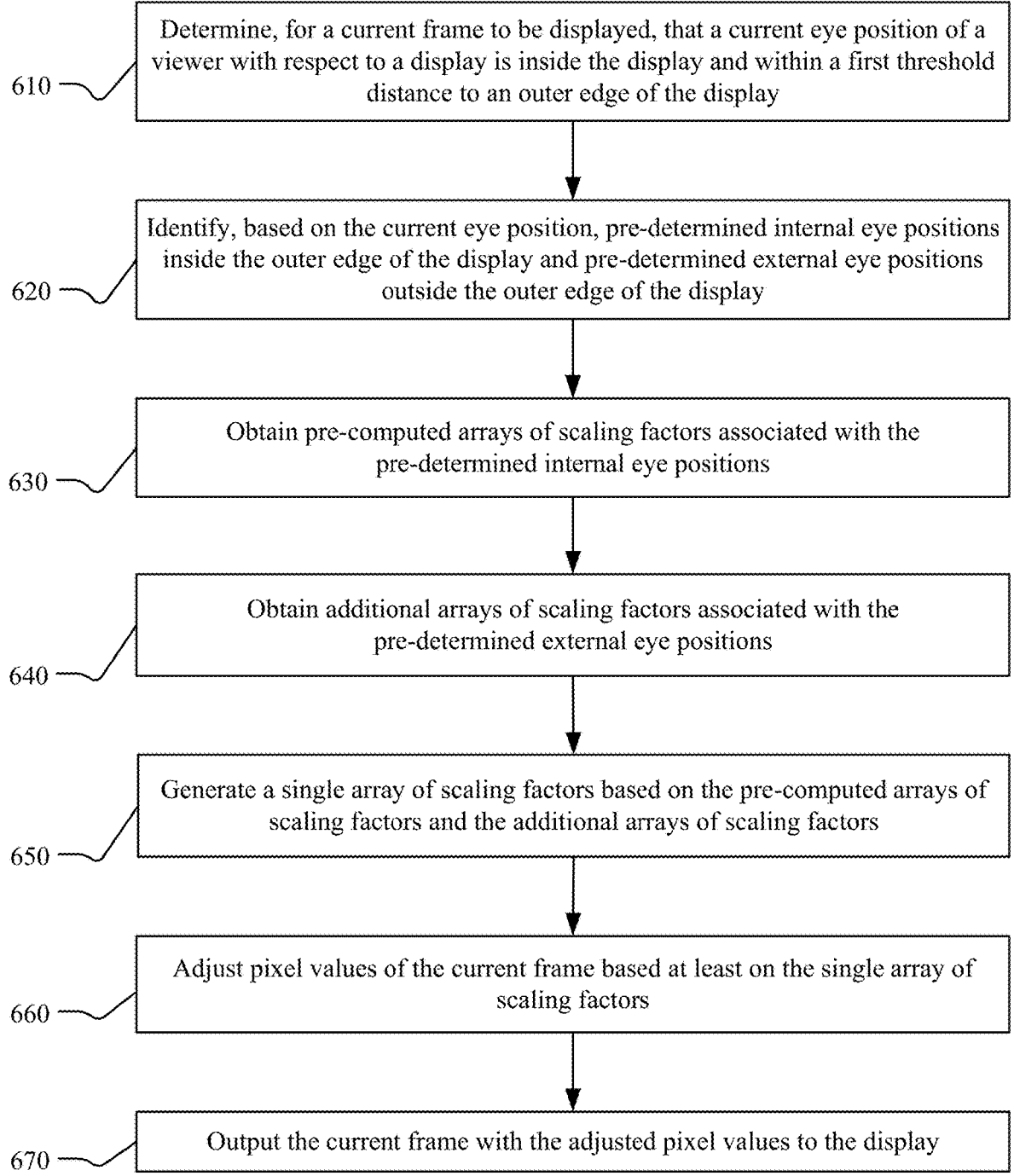
FIG. 6 illustrates an example method for correcting for waveguide non-uniformity by adjusting image pixel values using pre-generated correction maps for eye positions inside the waveguide and additional correction maps for eye positions outside the waveguide.

FIG. 6 illustrates an example method 600 for correcting for waveguide non-uniformity by adjusting image pixel values using pre-generated correction maps for eye positions inside the waveguide and additional correction maps for eye positions outside the waveguide. The method may begin at step 610, where a computing system may determine, for a current frame to be displayed, that a current eye position of a viewer with respect to a display is inside the display and within a first threshold distance to an outer edge of the display. In particular embodiments, the display may include a pupil replication waveguide for transmitting image light to eyes of the viewer. In particular embodiments, the current eye position of the viewer may be determined using an eye tracking system. At step 620, the computing system may identify, based on the current eye position, pre-determined internal eye positions inside the outer edge of the display and pre-determined external eye positions outside the outer edge of the display.

At step 630, the method may include the computing system obtaining pre-computed arrays of scaling factors associated with the pre-determined internal eye positions. In particular embodiments, obtaining the pre-computed arrays of scaling factors may include accessing pre-computed arrays of scaling factors associated with the pre-determined internal eye positions from a computer storage. At step 640, the computing system may obtain additional arrays of scaling factors associated with the pre-determined external eye positions. In one example, obtaining the additional arrays of scaling factors may include accessing pre-computed arrays of scaling factors associated with the pre-determined external eye positions from a computer storage. In another example, obtaining the additional arrays of scaling factors may include computing the additional arrays of scaling factors on an as-needed basis in response to determining that the current eye position is inside the display and within a first threshold distance to an outer edge of the display.

At step 650, the method may include the computing system generating a single array of scaling factors based on the pre-computed arrays of scaling factors and the additional arrays of scaling factors. The single array of scaling factors may be usable to correct view-dependent non-uniformities of the display at the current eye position in the boundary region near the edge of the eye-box area. In particular embodiments, the pre-determined internal eye positions and the pre-determined external eye positions may collectively form a grid including a pre-determined number of eye positions nearest to the current eye position and generating the single array of scaling factors may include applying bicubic interpolation to the arrays of scaling factors associated with the eye positions of the grid to generate a customized array of scaling factors for the current eye position.

At step 660, the computing system may adjust pixel values of the current frame based at least on the single array of scaling factors. At step 670, the computing system may output the current frame with the adjusted pixel values to the display. In particular embodiments, the pre-computed arrays of scaling factors, the additional arrays of scaling factors, and the single array of scaling factors may be associated with a particular color channel and the adjusted pixel values of the current frame may be associated with the particular color channel. In particular embodiments, method 600 may be repeated for one or more other color channels or respective instances of method 600 may be performed in parallel for each of multiple color channels.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for correcting for waveguide non-uniformity by adjusting image pixel values using pre-generated correction maps for eye positions inside the waveguide and additional correction maps for eye positions outside the waveguide, including the particular steps of the method of FIG. 6, this disclosure contemplates any suitable method for correcting for waveguide non-uniformity by adjusting image pixel values using pre-generated correction maps for eye positions inside the waveguide and additional correction maps for eye positions outside the waveguide including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

In particular embodiments, methods for adjusting the image pixel values to correct view-dependent non-uniformities of a display at the current eye position may be further dependent on temporal filtering. For example, method 600 illustrated in FIG. 6 may also include accessing supplementary arrays of scaling factors used for correcting view-dependent non-uniformities of the display for one or more proceeding frames of the current frame and adjusting the pixel values of the current frame is further based on the supplementary arrays of scaling factors (not shown in FIG. 6).

As described herein, obtaining additional arrays of scaling factors associated with pre-determined external eye positions may include computing the additional arrays of scaling factors on an as-needed basis in response to determining that the current eye position is inside the display and within a first threshold distance to an outer edge of the display. In particular embodiments, computing the additional arrays of scaling factors may include accessing, from a computer storage, pre-computed arrays of scaling factors associated with one or more pre-determined internal eye positions and extrapolating, in one or more directions, data from the pre-computed arrays of scaling factors associated with the one or more pre-determined internal eye positions to generate the additional arrays of scaling factors.

Figure 7:
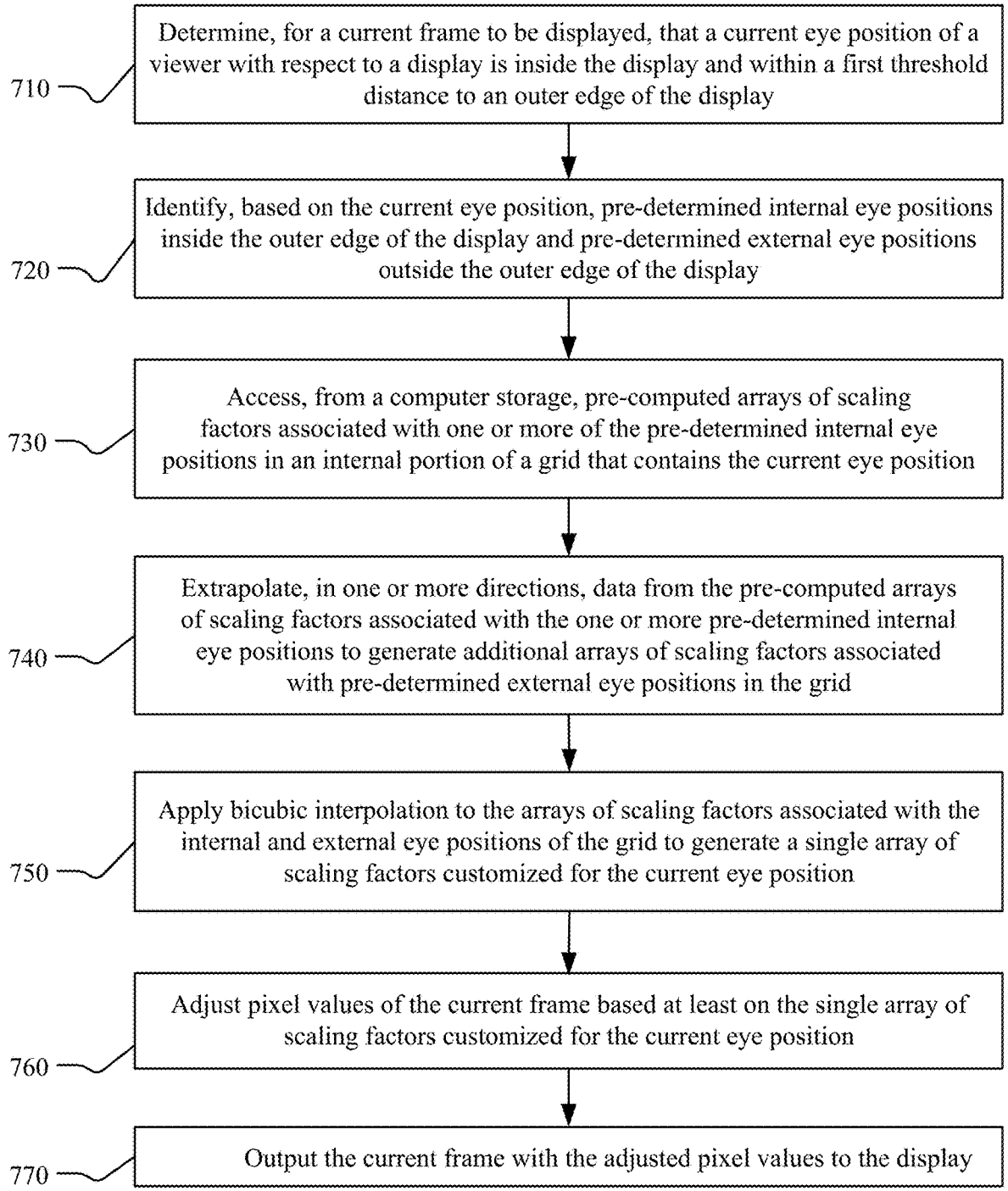
FIG. 7 illustrates an example method for generating correction maps for eye positions outside the waveguide.

FIG. 7 illustrates an example method 700 for generating correction maps for eye positions outside the waveguide area (i.e., the eye-box area). The method may begin at step 710, where a computing system may determine, for a current frame to be displayed, that a current eye position of a viewer with respect to a display is inside the display and within a first threshold distance to an outer edge of the display. In particular embodiments, the display may include a pupil replication waveguide for transmitting image light to eyes of the viewer. In particular embodiments, the current eye position of the viewer may be determined using an eye tracking system. At step 720, the computing system may identify, based on the current eye position, pre-determined internal eye positions inside the outer edge of the display and pre-determined external eye positions outside the outer edge of the display.

At step 730, the computing system may access, from a computer storage, pre-computed arrays of scaling factors associated with one or more of the pre-determined internal eye positions in an internal portion of a grid that contains the current eye position. For example, the pre-determined internal eye positions and the pre-determined external eye positions may collectively form a grid comprising a pre-determined number of eye positions nearest to the current eye position. At step 740, the computing system may extrapolate, in one or more directions, data from the pre-computed arrays of scaling factors associated with the one or more pre-determined internal eye positions to generate additional arrays of scaling factors associated with pre-determined external eye positions in the grid. For example, the extrapolating may include performing a bilinear extrapolation based on average, weighted average, or median values of scaling factors in the pre-computed arrays of scaling factors associated with the one or more pre-determined internal eye positions.

At step 750, the computing system may apply bicubic interpolation to the arrays of scaling factors associated with the internal and external eye positions of the grid to generate a single array of scaling factors customized for the current eye position. The single array of scaling factors may be usable to correct view-dependent non-uniformities of the display at the current eye position in the boundary region near the edge of the eye-box area. At step 760, the computing system may adjust pixel values of the current frame based at least on the single array of scaling factors customized for the current eye position. At step 770, the computing system may output the current frame with the adjusted pixel values to the display. In particular embodiments, the pre-computed arrays of scaling factors, the additional arrays of scaling factors, and the single array of scaling factors may be associated with a particular color channel and the adjusted pixel values of the current frame may be associated with the particular color channel. In particular embodiments, method 700 may be repeated for one or more other color channels or respective instances of method 700 may be performed in parallel for each of multiple color channels.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating correction maps for eye positions outside the waveguide area (i.e., the eye-box area), including the particular steps of the method of FIG. 7, this disclosure contemplates any suitable method for generating correction maps for eye positions outside the waveguide area including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
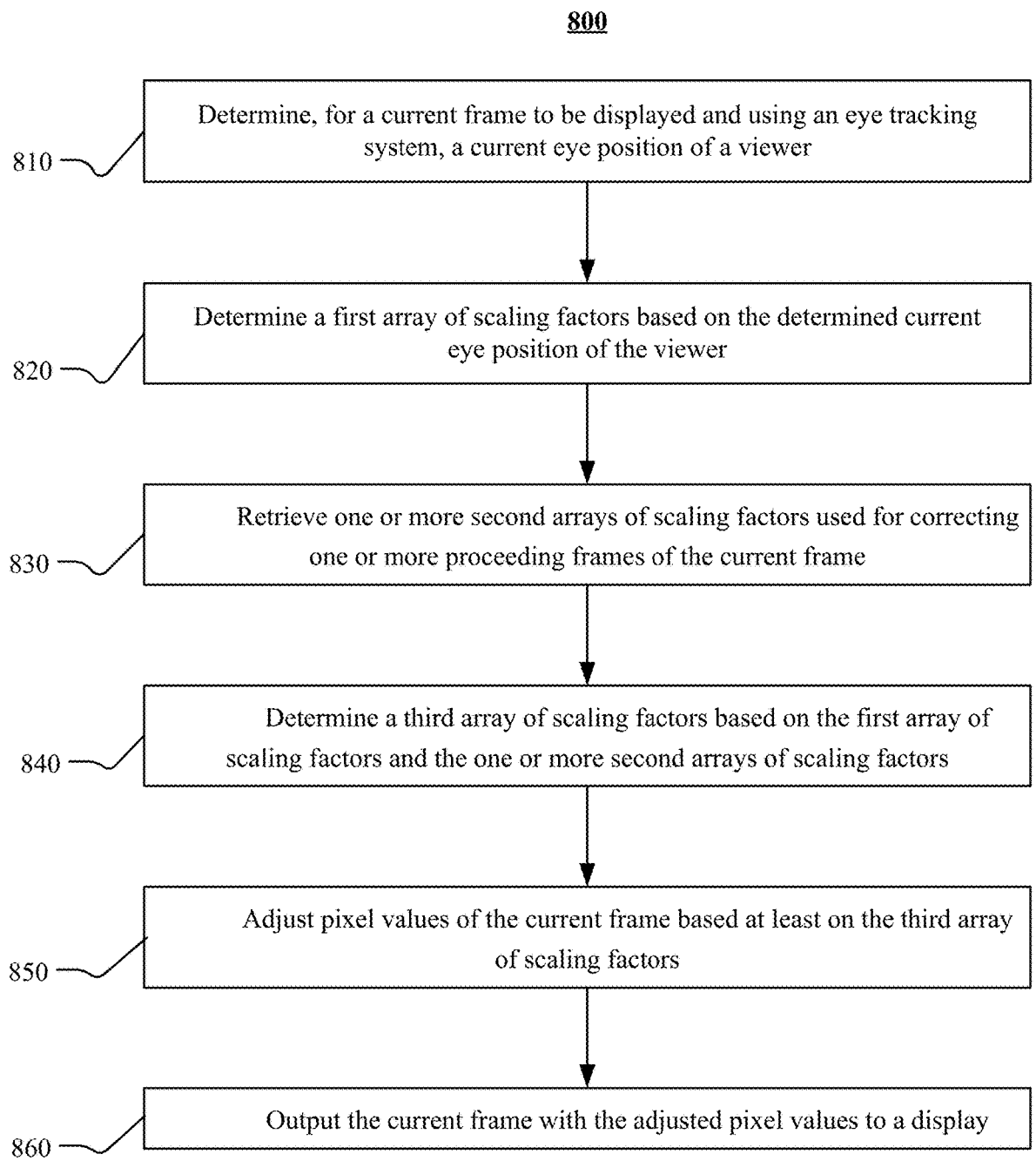
FIG. 8 illustrates an example method for correcting for waveguide non-uniformity by adjusting image pixel values using correction maps and temporal filtering.

FIG. 8 illustrates an example method 800 for correcting for waveguide non-uniformity by adjusting image pixel values using correction maps and temporal filtering. The method may begin at step 810, where a computing system may determine, for a current frame to be displayed and using an eye tracking system, a current eye position of a viewer. In particular embodiments, the current eye position may be with respect to a pupil replication waveguide of the display for transmitting image light to eyes of the viewer. At step 820, the system may determine a first array of scaling factors based on the determined current eye position of the viewer. The determination of the first array of scaling factors may be dependent on whether the current eye position is within the central region of the waveguide area or is within a boundary region near an edge of the waveguide area. If the current eye position is within the central region of the waveguide area (as illustrated in FIG. 4C and described above), the first array of scaling factors may be generated based on bilinear interpolation of scaling factors included only pre-generated correction maps associated with eye positions within the eye-box. However, if the current eye position is within a boundary region near an edge of the waveguide area (as illustrated in FIG. 4E and described above), the first array of scaling factors may be generated based on bilinear interpolation of scaling factors included in pre-generated correction maps associated with eye positions within the eye-box and additional correction maps associated with eye positions outside the eye-box.

At step 830, the system may retrieve one or more second arrays of scaling factors used for correcting one or more proceeding frames of the current frame. At step 840, the system may determine a third array of scaling factors based on the first array of scaling factors determined based on the current eye position and the one or more second arrays of scaling factors used for correcting the one or more proceeding frames using, e.g., temporal filtering. At step 850, the system may adjust pixel values of the current frame based at least on the third array of scaling factors. At step 860, the system may output the current frame with the adjusted pixel values to a display. In particular embodiments, the third array of scaling factors may be up-sampled prior to being used for adjusting the pixel values for display. In particular embodiments, the first array of scaling factors, the second arrays of scaling factors, and the third array of scaling factors may be associated with a particular color channel and the adjusted pixel values of the current frame may be associated with the particular color channel. In particular embodiments, method 800 may be repeated for one or more other color channels or respective instances of method 800 may be performed in parallel for each of multiple color channels.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for waveguide non-uniformity by adjusting image pixel values using correction maps and temporal filtering, including the particular steps of the method of FIG. 8, this disclosure contemplates any suitable method for waveguide non-uniformity by adjusting image pixel values using correction maps and temporal filtering including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

In particular embodiments, the system may generate collections of correction maps corresponding to larger numbers of predetermined eye positions than the 6×6 mesh grid of correction maps described in several examples herein. For example, if the spatial frequency of the non-uniformity in the waveguide increased, larger maps might be needed to represent the appropriate corrections. In this example, the larger maps may be pre-computed and stored in a computer storage in a compressed form and may be decompressed at run time on an as-needed basis.

In particular embodiments, rather than pre-computing arrays of scaling factors for respective eye positions having a uniform distribution over the eye-box area, the system may pre-compute arrays of scaling factors for respective eye positions that correspond to a statistical distribution of eye positions observed in user data. For example, the statistical distribution of pupils in the eye-box may be dependent on eye anatomy and, more specifically, on where people move their eyes, statistically speaking. In this example, it might be useful to have more sample measurements, and thus higher resolution, in the central regions of the eye-box than farther from the center, such as near the edges of the eye-box. The highest resolution (and the highest density of sample points) may correspond to eye positions in the center of the eye-box, with gradually lower resolution (and a lower density of sample points) for eye positions in regions farther and farther from the center. Arrays of scaling factors based on measurements at these non-uniformly distributed sample points may be pre-computed and stored in a database, which may be stored in a computer storage.

Following the implementation of the improved methods described herein for correcting for waveguide non-uniformity by adjusting image pixel values using pre-generated correction maps for eye positions inside the waveguide and additional correction maps for eye positions outside the waveguide, data from an eye tracking system was used to simulate operation and correction over the entire eye-box. As in the previous example, the system performing the simulation provided ground truth and eye-tracked pupil estimates to test pupil-based correction schemes, such as the dynamic uniformity correction approach described above, in a simulated pipeline. In this example, however, errors observed for the samples close to the edge of the eye-box due when using the previous interpolation scheme, in which points outside the eye-box were ignored, were reduced or eliminated using the improved methods. In other words, the extrapolation approach describe herein was shown to be resistant to image quality degradation for eye positions close to the eye-box edges. This approach therefore results in similar perceptual image quality for eye positions located either centrally or eccentrically in the eye-box, therefore increasing the viable eye-box range for dynamic uniformity correction over the previous interpolation method that truncated at the edges of the eye-box. Performance improvement at eccentric eye-box positions has been confirmed by computational perceptual analysis.

In particular embodiments, a computing device, such as any of those described herein, may use an artificial neural network to learn the coefficients of the corrections maps used to correct view-dependent non-uniformities of the display at the current eye position. For example, an artificial neural network may recursively update the weightings of the correction maps based on a combination of time-associated eye positions of a particular user within the eye-box area and either an explicit or implicit measure, through time, of non-uniformity detection at different eye-box locations. Based on those inputs through space and time, a machine learning algorithm may be trained to weight certain maps more heavily than others while capturing both the idiosyncrasies of the particular user's ocular orienting dynamics, their visual sensitivity to non-uniformities, and/or the specific physical non-uniformity shape for that unit.

Figure 9:
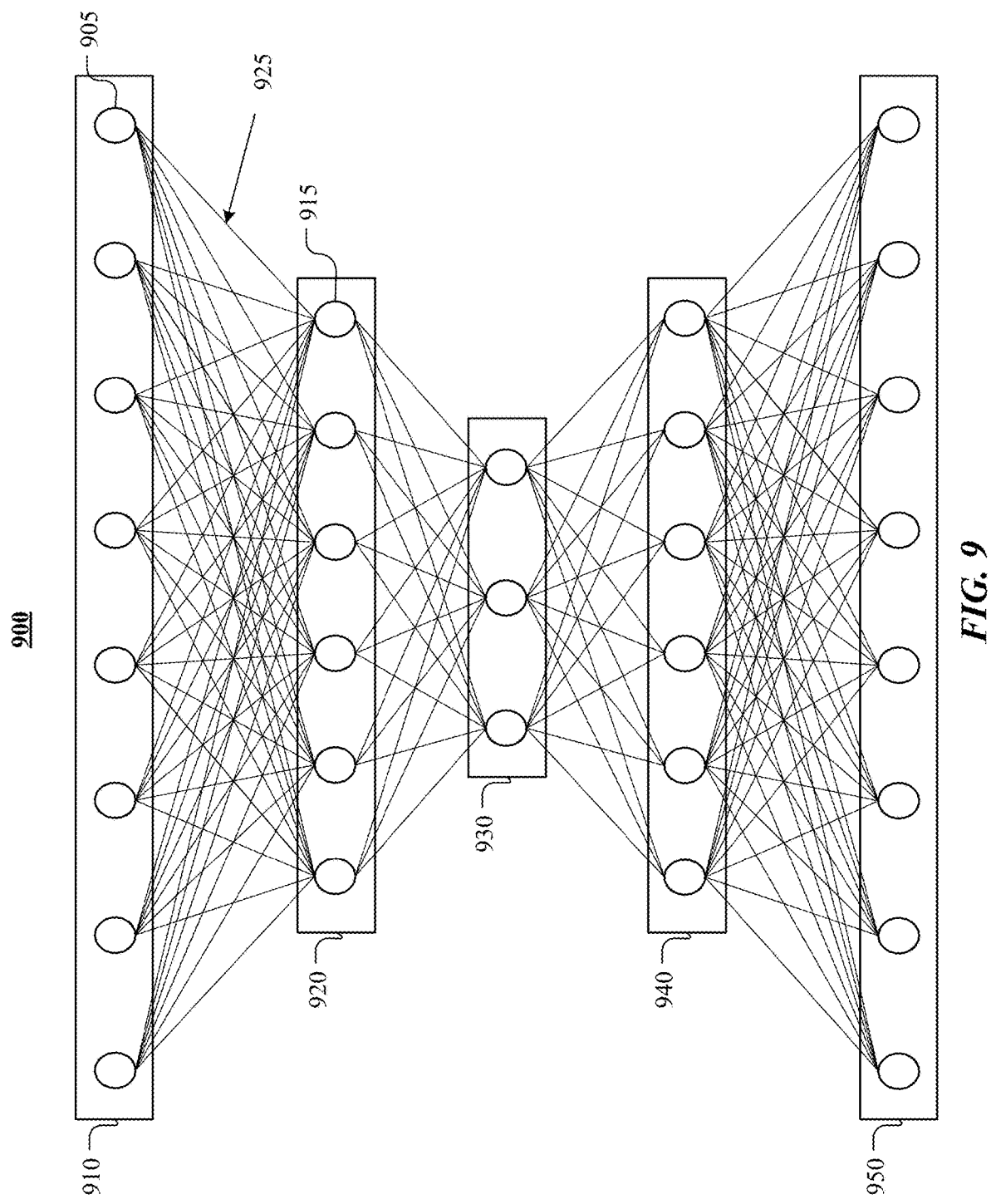
FIG. 9 illustrates an example artificial neural network.

FIG. 9 illustrates an example artificial neural network ("ANN") 900. In particular embodiments, an ANN may refer to a computational model comprising one or more nodes. Example ANN 900 may comprise an input layer 910, hidden layers 920, 930, 940, and an output layer 950. Each layer of the ANN 900 may comprise one or more nodes, such as a node 905 or a node 915. In particular embodiments, each node of an ANN may be connected to another node of the ANN. As an example and not by way of limitation, each node of the input layer 910 may be connected to one of more nodes of the hidden layer 920. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 9 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 9 depicts a connection between each node of the input layer 910 and each node of the hidden layer 920, one or more nodes of the input layer 910 may not be connected to one or more nodes of the hidden layer 920.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 920 may comprise the output of one or more nodes of the input layer 910. As another example and not by way of limitation, the input to each node of the output layer 950 may comprise the output of one or more nodes of the hidden layer 940. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0,s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 925 between the node 905 and the node 915 may have a weighting coefficient of 0.4, which may indicate that 0.4 multiplied by the output of the node 905 is used as an input to the node 915. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 900 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Figure 10:
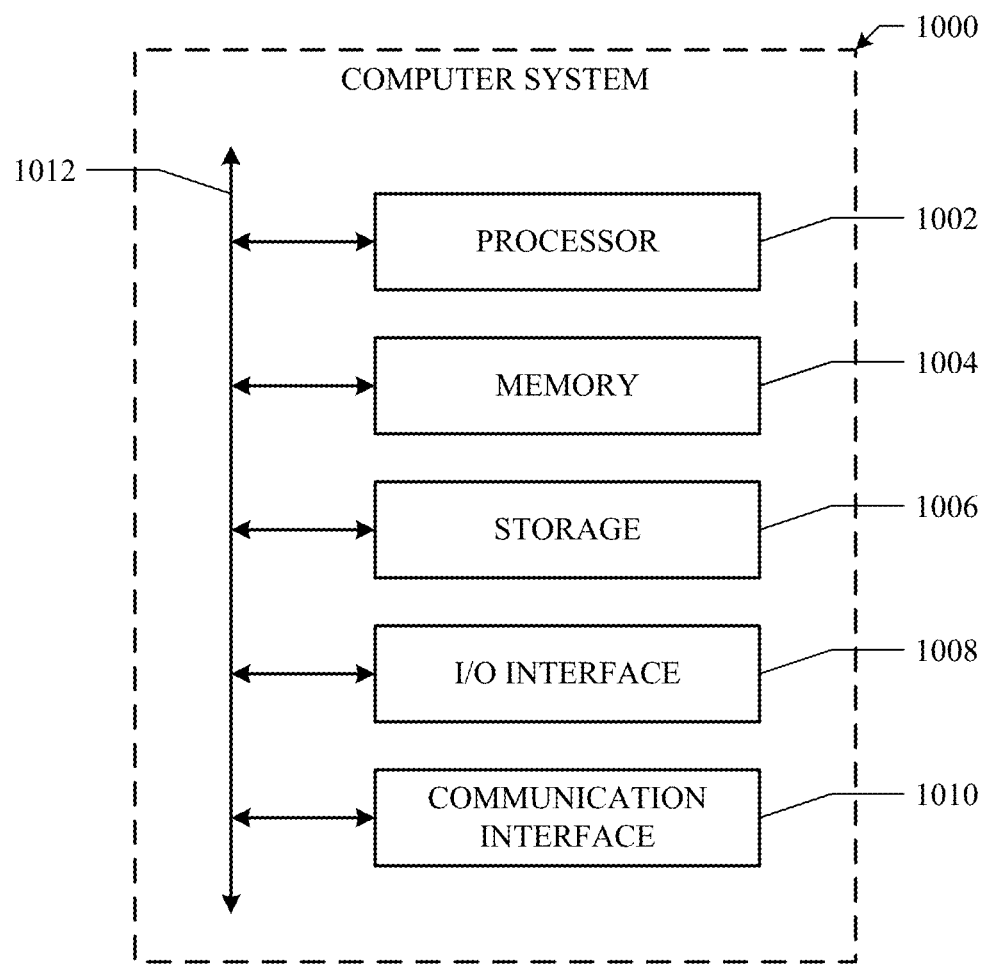
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   determining, for a current frame, that a current eye position of a viewer with respect to a display area is inside a pre-determined eye position range with respect to the display area and is within a first threshold distance to an outer edge of the pre-determined eye position range with respect to the display area;
   identifying, based on the current eye position, pre-determined internal eye positions inside the outer edge of the pre-determined eye position range with respect to the display area and pre-determined external eye positions outside the outer edge of the pre-determined eye position range with respect to the display area;
   obtaining pre-determined arrays of scaling factors associated with the pre-determined internal eye positions;
   obtaining additional arrays of scaling factors associated with the pre-determined external eye positions;
   generating a single array of scaling factors based on the pre-determined arrays of scaling factors and the additional arrays of scaling factors;
   adjusting pixel values of the current frame based at least on the single array of scaling factors; and
   outputting the current frame with the adjusted pixel values to a display associated with the display area.

2. The method of claim 1, wherein the single array of scaling factors is usable to correct view-dependent non-uniformities of the display at the current eye position.

3. The method of claim 1, wherein the pre-determined internal eye positions and the pre-determined external eye positions collectively form a grid comprising a plurality of pre-determined eye positions within a second threshold distance to the current eye position.

4. The method of claim 3, wherein generating the single array of scaling factors comprises applying bicubic interpolation to the arrays of scaling factors associated with the plurality of pre-determined eye positions of the grid to generate a customized array of scaling factors for the current eye position.

5. The method of claim 1, wherein obtaining the pre-determined arrays of scaling factors comprises accessing pre-computed arrays of scaling factors associated with the pre-determined internal eye positions from a computer storage.

6. The method of claim 1, wherein:
the pre-determined arrays of scaling factors, the additional arrays of scaling factors, and the single array of scaling factors are associated with a particular color channel; and
the adjusted pixel values of the current frame are associated with the particular color channel.

7. The method of claim 1, wherein obtaining the additional arrays of scaling factors comprises accessing pre-computed arrays of scaling factors associated with the pre-determined external eye positions from a computer storage.

8. The method of claim 1, wherein obtaining the additional arrays of scaling factors comprises computing the additional arrays of scaling factors in response to determining that the current eye position is inside the pre-determined eye position range with respect to the display area and within the first threshold distance to the outer edge of the pre-determined eye position range with respect to the display area.

9. The method of claim 8, wherein computing the additional arrays of scaling factors comprises:
accessing, from a computer storage, pre-computed arrays of scaling factors associated with one or more of the pre-determined internal eye positions; and
extrapolating, in one or more directions, data from the pre-computed arrays of scaling factors associated with the one or more pre-determined internal eye positions to generate the additional arrays of scaling factors.

10. The method of claim 9, wherein the extrapolating comprises performing a bilinear extrapolation based on average, weighted average, or median values of scaling factors in the pre-computed arrays of scaling factors associated with the one or more pre-determined internal eye positions.

11. The method of claim 1, wherein:
the method further comprises accessing supplementary arrays of scaling factors used for correcting view-dependent non-uniformities of the display for one or more preceding frames of the current frame; and
adjusting the pixel values of the current frame is further based on the supplementary arrays of scaling factors.

12. The method of claim 1, wherein:
the display comprises a pupil replication waveguide for transmitting image light to eyes of the viewer; and
the current eye position of the viewer is determined using an eye tracking system.

13. One or more computer-readable non-transitory storage media embodying software that is operable when executed to:
determine, for a current frame, that a current eye position of a viewer with respect to a display area is inside a pre-determined eye position range with respect to the display area and is within a first threshold distance to an outer edge of the pre-determined eye position range with respect to the display area;
identify, based on the current eye position, pre-determined internal eye positions inside the outer edge of the pre-determined eye position range with respect to the display area and pre-determined external eye positions outside the outer edge of the pre-determined eye position range with respect to the display area;
obtain pre-determined arrays of scaling factors associated with the pre-determined internal eye positions;
obtain additional arrays of scaling factors associated with the pre-determined external eye positions;
generate a single array of scaling factors based on the pre-determined arrays of scaling factors and the additional arrays of scaling factors;
adjust pixel values of the current frame based at least on the single array of scaling factors; and
output the current frame with the adjusted pixel values to a display associated with the display area.

14. The media of claim 13, wherein:
the pre-determined internal eye positions and the pre-determined external eye positions collectively form a grid comprising a plurality of pre-determined eye positions within a second threshold distance to the current eye position; and
to generate the single array of scaling factors, the software is operable when executed to apply bicubic interpolation to the arrays of scaling factors associated with the plurality of pre-determined eye positions of the grid to generate a customized array of scaling factors for the current eye position.

15. The media of claim 13, wherein:
to obtain the pre-determined arrays of scaling factors, the software is operable when executed to access pre-computed arrays of scaling factors associated with the pre-determined internal eye positions from a computer storage; and
to obtain the additional arrays of scaling factors, the software is operable when executed to access pre-computed arrays of scaling factors associated with the pre-determined external eye positions from the computer storage.

16. The media of claim 13, wherein:
to obtain the pre-determined arrays of scaling factors, the software is operable when executed to access pre-computed arrays of scaling factors associated with the pre-determined internal eye positions from a computer storage; and
to obtain the additional arrays of scaling factors, the software is operable when executed to, in response to determining that the current eye position is inside the pre-determined eye position range with respect to the display area and within the first threshold distance to the outer edge of the pre-determined eye position range with respect to the display area:
access, from the computer storage, pre-computed arrays of scaling factors associated with one or more of the pre-determined internal eye positions; and
extrapolate, in one or more directions, data from the pre-computed arrays of scaling factors associated with the one or more pre-determined internal eye positions to generate the additional arrays of scaling factors.

17. A system comprising:
one or more processors; and
one or more computer-readable non-transitory storage media coupled to one or more of the processors and comprising program instructions operable when executed by one or more of the processors to cause the system to:
determine, for a current frame, that a current eye position of a viewer with respect to a display area is inside a pre-determined eye position range with respect to the display area and is within a first threshold distance to an outer edge of the pre-determined eye position range with respect to the display area;
identify, based on the current eye position, pre-determined internal eye positions inside the outer edge of the pre-determined eye position range with respect to the display area and pre-determined external eye positions outside the outer edge of the pre-determined eye position range with respect to the display area;

obtain pre-determined arrays of scaling factors associated with the pre-determined internal eye positions;

obtain additional arrays of scaling factors associated with the pre-determined external eye positions;

generate a single array of scaling factors based on the pre-determined arrays of scaling factors and the additional arrays of scaling factors;

adjust pixel values of the current frame based at least on the single array of scaling factors; and output the current frame with the adjusted pixel values to a display associated with the display area.

18. The system of claim 17, wherein:
the pre-determined internal eye positions and the pre-determined external eye positions collectively form a grid comprising a plurality of pre-determined eye positions within a second threshold distance to the current eye position; and
to generate the single array of scaling factors, the program instructions are operable to cause the system to apply bicubic interpolation to the arrays of scaling factors associated with the plurality of pre-determined eye positions of the grid to generate a customized array of scaling factors for the current eye position.

19. The system of claim 17, wherein:
to obtain the pre-determined arrays of scaling factors, the program instructions are operable to cause the system to access pre-computed arrays of scaling factors associated with the pre-determined internal eye positions from a computer storage; and
to obtain the additional arrays of scaling factors, the program instructions are operable to cause the system to access pre-computed arrays of scaling factors associated with the pre-determined external eye positions from the computer storage.

20. The system of claim 17, wherein:
to obtain the pre-determined arrays of scaling factors, the program instructions are operable to cause the system to access pre-computed arrays of scaling factors associated with the pre-determined internal eye positions from a computer storage; and
to obtain the additional arrays of scaling factors, the program instructions are operable to cause the system to, in response to determining that the current eye position is inside the pre-determined eye position range with respect to the display area and within the first threshold distance to an outer edge of the pre-determined eye position range with respect to the display area:
access, from the computer storage, pre-computed arrays of scaling factors associated with one or more of the pre-determined internal eye positions; and
extrapolate, in one or more directions, data from the pre-computed arrays of scaling factors associated with the one or more pre-determined internal eye positions to generate the additional arrays of scaling factors.

* * * * *